United States Patent
Liou et al.

(10) Patent No.: US 11,791,888 B2
(45) Date of Patent: Oct. 17, 2023

(54) METHOD AND USER EQUIPMENT FOR WIRELESS COMMUNICATION IN WIRELESS COMMUNICATION SYSTEM

(71) Applicant: FG Innovation Company Limited, Tuen Mun (HK)

(72) Inventors: Jia-Hong Liou, Taipei (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/356,817

(22) Filed: Jun. 24, 2021

(65) Prior Publication Data

US 2021/0409096 A1 Dec. 30, 2021

Related U.S. Application Data

(60) Provisional application No. 63/043,724, filed on Jun. 24, 2020.

(51) Int. Cl.
*H04W 56/00* (2009.01)
*H04B 7/08* (2006.01)
(Continued)

(52) U.S. Cl.
CPC ........... *H04B 7/088* (2013.01); *H04B 7/0626* (2013.01); *H04L 1/1614* (2013.01);
(Continued)

(58) Field of Classification Search
CPC ..... H04B 7/088; H04B 7/0626; H04L 1/1614; H04W 24/10; H04W 56/001; H04W 80/02
See application file for complete search history.

(56) References Cited

U.S. PATENT DOCUMENTS

2016/0127139 A1* 5/2016 Tian ................. H04L 45/16
370/390
2018/0054745 A1* 2/2018 Wu ................. H04W 72/1273
(Continued)

FOREIGN PATENT DOCUMENTS

CN 110637496 A 12/2019
CN 110719154 A 1/2020
(Continued)

OTHER PUBLICATIONS

Oppo; SCell BFR MAC CE design; Nov. 18, 2019; p. 1-5 (Year: 2019).*

(Continued)

*Primary Examiner* — Fahmida S Chowdhury
(74) *Attorney, Agent, or Firm* — ScienBiziP, P.C.

(57) ABSTRACT

A method and a user equipment (UE) for wireless communication in a wireless communication system are provided. The method includes receiving serving-cell-configurations of a first serving cell and a second serving cell; receiving a Beam Failure Recovery (BFR) configuration including a configuration list that includes at least one configuration, the BFR configuration being used for at least the first serving cell, the at least one configuration indicating an identifier value of a Downlink Reference Signal (DL RS); performing a measurement by measuring at least one DL RS indicated by the configuration list, the measurement being associated with a measurement metric; selecting one configuration included in the configuration list after detecting beam failure in the first serving cell, the measurement metric of a DL RS indicated by the selected one configuration being greater than a threshold; transmitting a Medium Access Control-Control Element (MAC-CE) including at least one bitmap.

12 Claims, 8 Drawing Sheets

(51) Int. Cl.
    *H04W 76/19*     (2018.01)
    *H04W 24/10*     (2009.01)
    *H04B 7/06*     (2006.01)
    *H04L 5/00*     (2006.01)
    *H04W 80/02*     (2009.01)
    *H04L 1/1607*     (2023.01)

(52) U.S. Cl.
    CPC ........... *H04L 5/0048* (2013.01); *H04W 24/10* (2013.01); *H04W 56/001* (2013.01); *H04W 76/19* (2018.02); *H04W 80/02* (2013.01)

(56) References Cited

U.S. PATENT DOCUMENTS

| | | | |
|---|---|---|---|
| 2018/0302889 | A1 | 10/2018 | Guo et al. |
| 2019/0053288 | A1* | 2/2019 | Zhou .................... H04B 7/0626 |
| 2019/0190582 | A1* | 6/2019 | Guo ........................ H04L 1/0061 |
| 2019/0349798 | A1* | 11/2019 | Lin ......................... H04L 5/0048 |
| 2020/0052769 | A1* | 2/2020 | Cirik ..................... H04L 1/0026 |
| 2020/0137821 | A1 | 4/2020 | Cirik et al. |
| 2020/0177266 | A1 | 6/2020 | Kang et al. |
| 2020/0275523 | A1* | 8/2020 | Zhang ................... H04W 80/08 |
| 2020/0314708 | A1* | 10/2020 | Jassal .................... H04W 36/08 |
| 2020/0314711 | A1* | 10/2020 | Basu Mallick ....... H04W 36/08 |
| 2020/0344019 | A1* | 10/2020 | Da Silva ............... H04L 1/1851 |
| 2021/0105058 | A1* | 4/2021 | Lin ......................... H04W 76/19 |
| 2021/0195565 | A1* | 6/2021 | Venugopal ............ H04L 5/0096 |
| 2021/0234601 | A1* | 7/2021 | Awadin ................. H04L 5/0048 |
| 2022/0116096 | A1* | 4/2022 | Agiwal ............. H04W 74/0833 |
| 2022/0264475 | A1* | 8/2022 | Yi ....................... H04W 72/046 |

FOREIGN PATENT DOCUMENTS

| | | |
|---|---|---|
| CN | 110896546 A | 3/2020 |
| CN | 111083942 A | 4/2020 |
| EP | 3648368 A1 | 5/2020 |

OTHER PUBLICATIONS

Oppo, "SCell BFR MAC CE design", R2-1915157, 3GPP TSG-RAN WG2 Meeting #108, Reno, USA, Nov. 18-Nov. 22, 2019.
3GPP TS 38.214, "3rd Generation Partnership Project; Technical Specification Group Radio Access Network; NR; Physical layer procedures for data (Release 16)", V16.1.0 (Mar. 2020).
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", V16.1.0 (Mar. 2020).
3GPP TS 37.213, "3rd Generation Partnership Project; Technical Specification Group Radio Access Network; Physical layer procedures for shared spectrum channel access (Release 16)", V16.1.0 (Mar. 2020).
3GPP TS 38.101-1, "3rd Generation Partnership Project; Technical Specification Group Radio Access Network; NR; User Equipment (UE) radio transmission and reception; Part 1: Range 1 Standalone (Release 16)", V16.3.0 (Mar. 2020).
3GPP TS 38.101-2, "3rd Generation Partnership Project; Technical Specification Group Radio Access Network; NR; User Equipment (UE) radio transmission and reception; Part 2: Range 2 Standalone (Release 16)", V16.3.1 (Mar. 2020).
3GPP TS 38.306, "3rd Generation Partnership Project; Technical Specification Group Radio Access Network; NR; User Equipment (UE) radio access capabilities (Release 16)", V16.0.0 (Mar. 2020).
3GPP TS 38.321, "3rd Generation Partnership Project; Technical Specification Group Radio Access Network; NR; Medium Access Control (MAC) protocol specification (Release 16)", V16.0.0 (Mar. 2020).
3GPP TS 38.101-3, "3rd Generation Partnership Project; Technical Specification Group Radio Access Network; NR; User Equipment (UE) radio transmission and reception; Part 3: Range 1 and Range 2 Interworking operation with other radios (Release 16)", V16.3.0 (Mar. 2020).
3GPP TS 38.133, "3rd Generation Partnership Project; Technical Specification Group Radio Access Network; NR; Requirements for support of radio resource management (Release 16)", V16.3.0 (Mar. 2020).
3GPP TS 38.305, "3rd Generation Partnership Project; Technical Specification Group Radio Access Network; NG Radio Access Network (NG-RAN); Stage 2 functional specification of User Equipment (UE) positioning in NG-RAN (Release 16)", V16.0.0 (Mar. 2020).
3GPP TS 38.211, "3rd Generation Partnership Project; Technical Specification Group Radio Access Network; NR; Physical channels and modulation (Release 16)", V16.1.0 (Mar. 2020).
3GPP TS 38.212, "3rd Generation Partnership Project; Technical Specification Group Radio Access Network; NR; Multiplexing and channel coding (Release 16)", V16.1.0 (Mar. 2020).
3GPP TS 38.213, "3rd Generation Partnership Project; Technical Specification Group Radio Access Network; NR; Physical layer procedures for control (Release 16)", V16.1.0 (Mar. 2020).
3GPP TS 38.300, "3rd Generation Partnership Project; Technical Specification Group Radio Access Network; NR; NR and NG-RAN Overall Description; Stage 2 (Release 16)", V16.1.0 (Mar. 2020).
3GPP TS 38.331, "3rd Generation Partnership Project; Technical Specification Group Radio Access Network; NR; Radio Resource Control (RRC) protocol specification (Release 16)", V16.0.0 (Mar. 2020).
3GPP TS 38.473, "3rd Generation Partnership Project; Technical Specification Group Radio Access Network; NG-RAN; F1 application protocol (F1AP) (Release 16)", V16.1.0 (Mar. 2020).
Samsung et al., "Miscellaneous corrections on eMIMO", 3GPP TSG-RAN WG2 Meeting #110 electronic Online, Jun. 1-Jun. 12, 2020, R2-2005797.

\* cited by examiner

METHOD AND USER EQUIPMENT FOR WIRELESS COMMUNICATION IN WIRELESS COMMUNICATION SYSTEM

CROSS-REFERENCE TO RELATED APPLICATION(S)

The present disclosure claims the benefit of and priority of provisional U.S. Patent Application Ser. No. 63/043,724, filed on Jun. 24, 2020, entitled "Method and apparatus for indicating candidate beam in a wireless communication system" ("the '724 provisional"). The disclosure of the '724 provisional is hereby incorporated fully by reference into the present disclosure for all purposes.

FIELD

The present disclosure is related to wireless communication, and specifically, to method and user equipment (UE) for wireless communication in wireless communication system.

BACKGROUND

Abbreviations used in this disclosure include:
Abbreviation Full name
3GPP $3^{rd}$ Generation Partnership Project
5G $5^{th}$ Generation
Alt Alternative
BFR Beam Failure Recovery
BFRQ Beam Failure Recovery Request
BS Base Station
CB Contention-Based
CCCH Common Control Channel
CE Control Element
CF Contention-Free
CG Configured grant
CORESET Control Resource Set
CRI CSI-RS Resource Index
C-RNTI Cell Radio Network Temporary Identifier
CSI Channel State Information
CSI-RS Channel State Information based Reference Signal
CSI-RSRP Channel State Information based Reference Signal Received Power
DCI Downlink Control Information
DL Downlink
eNB evolved Node B
HARQ Hybrid Automatic Repeat request
LTE Long Term Evolution
MAC Medium Access Control
MIB Master Information Block
MSG Message
NR New Radio
NW Network
PCell Primary Cell
PDCCH Physical Downlink Control Channel
PDSCH Physical Downlink Shared Channel
PDU Packet Data Unit
PHY Physical
PRACH Physical Random Access Channel
PSCell Primary Secondary Cell
PTAG Primary TAG
PUCCH Physical Uplink Control Channel
RA Random Access
RACH Random Access Channel
RAPID Random Access Preamble Index
RAR Random Access Response
RA-RNTI Random Access Radio Network Temporary Identifier
RRC Radio Resource Control
RS Reference Signal
RSRP Reference Signal Received Power
RX Reception
SCell Secondary Cell
SDU Service Data Unit
SINR Signal to Interference plus Noise Ratio
SRS Sounding Reference Signal
STAG Secondary TAG
SpCell Special Cell
SS Synchronization Signal
SSB Synchronization Signal Block
SS-RSRP Synchronization Signal-Reference Signal Received Power
SUL Supplementary Uplink
TA Timing Advance or Time Alignment
TAG Time Alignment Group
TB Transport Block
TBS Transport Block Size
TRP Transmission/Reception Point
TS Technical Specification
TTI Transmission Time Interval
TX Transmission
UCI Uplink Control Information
UE User Equipment
UL Uplink
UL-SCH Uplink Shared Channel Various efforts have been made to improve different aspects of wireless communication for cellular wireless communication systems, such as 5G NR by improving data rate, latency, reliability, and mobility. The 5G NR system is designed to provide flexibility and configurability to optimize the network services and types, accommodating various use cases such as Enhanced Mobile Broadband (eMBB), Massive Machine Type Communication (mMTC), and Ultra-Reliable and Low-Latency Communication (URLLC). However, as the demand for radio access continues to increase, there exists a need for further improvements in the technology.

SUMMARY

The present disclosure is related to user equipment (UE) and method for user equipment in a wireless communication system, such that a MAC-CE for BFR for at least an SCell could indicate information for deriving candidate beam RS, if any, without ambiguity.

According to an aspect of the present disclosure, a method for a UE for wireless communication in a wireless communication system is provided. The method includes receiving serving-cell-configurations of a first serving cell and a second serving cell; receiving a Beam Failure Recovery (BFR) configuration including a configuration list that includes at least one configuration, the BFR configuration being used for at least the first serving cell, the at least one configuration indicating an identifier value of a Downlink Reference Signal (DL RS); performing a measurement by measuring at least one DL RS indicated by the configuration list, the measurement being associated with a measurement metric; selecting one configuration included in the configuration list after detecting beam failure in the first serving cell, the measurement metric of a DL RS indicated by the selected one configuration being greater than a threshold; transmitting a Medium Access Control-Control Element (MAC-CE) including at least one bitmap, each of the at least one bitmap indicating DL RS related information for one serving cell; and indicating the DL RS by a bitmap from the at least one bitmap, the bitmap being associated with the first serving cell, wherein a value indicated by the bitmap corresponds to a configuring order of the selected one configuration in the configuration list.

According to another aspect of the present disclosure, a UE for wireless communication in a wireless communication system is provided. The UE includes one or more non-transitory computer-readable media having computer-executable instructions embodied thereon; and at least one processor coupled to the one or more non-transitory computer-readable media, the at least one processor is configured to execute the computer-executable instructions to: receiving serving-cell-configurations of a first serving cell and a second serving cell; receiving a Beam Failure Recovery (BFR) configuration including a configuration list that includes at least one configuration, the BFR configuration being used for at least the first serving cell, the at least one configuration indicating an identifier value of a Downlink Reference Signal (DL RS); performing a measurement by measuring at least one DL RS indicated by the configuration list, the measurement being associated with a measurement metric; selecting one configuration included in the configuration list after detecting beam failure in the first serving cell, the measurement metric of a DL RS indicated by the selected one configuration being greater than a threshold; transmitting a Medium Access Control-Control Element (MAC-CE) including at least one bitmap, each of the at least one bitmap indicating DL RS related information for one serving cell; and indicating the DL RS by a bitmap from the at least one bitmap, the bitmap being associated with the first serving cell, wherein a value indicated by the bitmap corresponds to a configuring order of the selected one configuration in the configuration list.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
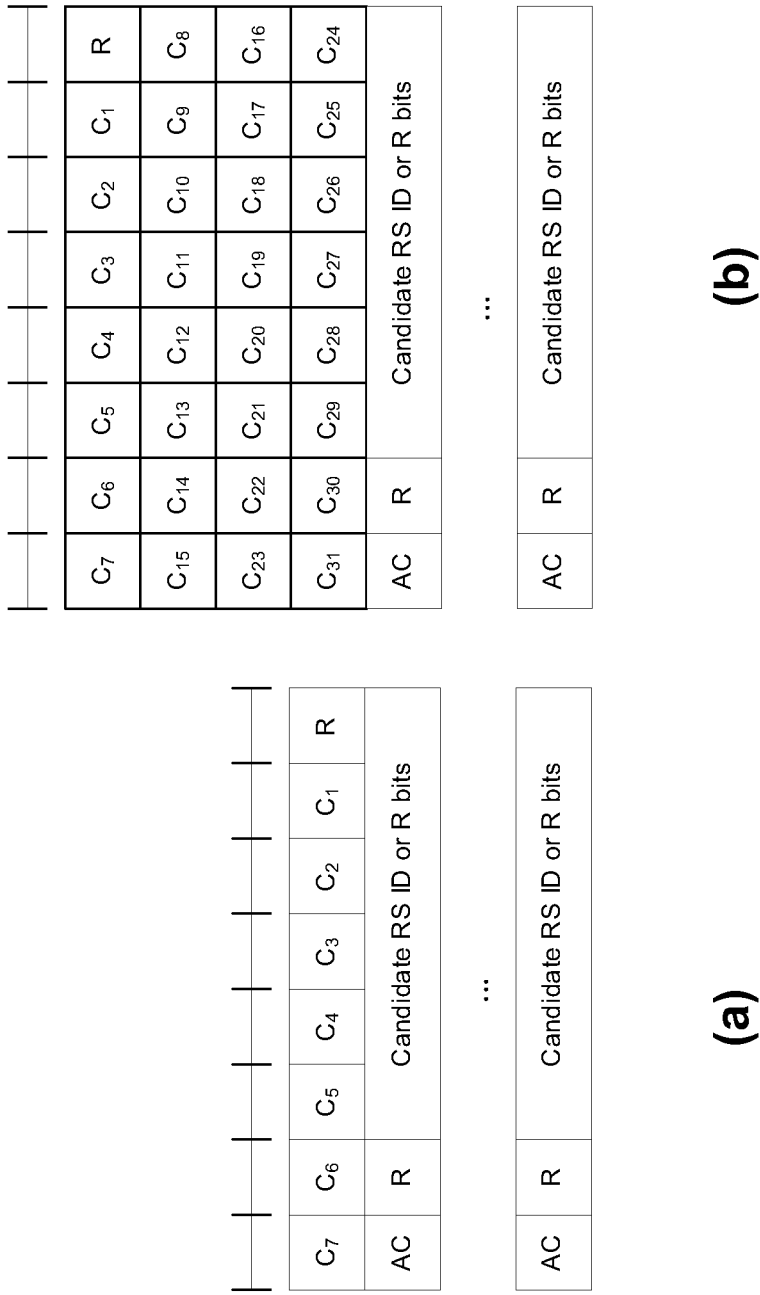
FIG. 1 shows a schematic diagram of two MAC-CEs according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

It is noted that any two or more than two of the following paragraphs, (sub)-bullets, points or actions described in each embodiment or implementation may be combined logically, reasonably, and properly to form a specific method.

It is noted that any sentence, paragraph, (sub)-bullet, point or action described in each of the following embodiments or implementations may be implemented independently and separately to form a specific method. Dependency (e.g., "based on," "more specifically," etc.) in the following embodiments or implementations is just one possible embodiment which would not restrict the specific method.

Furthermore, some or all of the following terminology and assumption may be used hereafter.

BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.

TRP: a transmission and reception point provides network coverage and directly communicates with UEs. TRP may be referred to as distributed unit (DU) or network node.

Cell: a cell is composed of one or multiple associated TRPs (e.g., coverage of the cell is composed of coverage of all associated TRP(s)). One cell is controlled by one BS. Cell may be referred to as TRP group (TRPG).

Serving beam: serving beam for a UE is a beam generated by a network node (e.g., a TRP) which is configured to be used to communicate with the UE, e.g. for transmission and/or reception.

Candidate beam: candidate beam for a UE is a candidate of a serving beam. Serving beam may or may not be candidate beam.

Early Data Transmission: Allows one uplink data transmission optionally followed by one downlink data transmission during the random access procedure as specified in 3GPP Technical Specification (TS) 36.300. The S1 connection is established or resumed upon reception of the uplink data and may be released or suspended along with the transmission of the downlink data. Early data transmission refers to both CP-EDT and UP-EDT.

Transmission using PUR: Allows one uplink data transmission using preconfigured uplink resource from RRC IDLE mode as specified in 3GPP TS 36.300. Transmission using PUR refers to both CP transmission using PUR and UP transmission using PUR.

One or some of concerned/addressed scenario(s) or observation(s) may be shown in the following paragraphs.

A (Truncated) BFR MAC CE may include the beam failure recovery information of one or multiple cells that has detected beam failure.

The beam failure recovery information of a cell that has detected beam failure may be provided via an octet. Specifically, the octet may contain a candidate RS identifier (ID) field for the cell, and the value in the candidate RS ID field may be set to the index of an SSB (e.g., SSB-Index) with SS-RSRP above rsrp-ThresholdBFR amongst the SSBs included in candidateBeamRSSCellList or to the index of a CSI-RS (e.g., NZP-CSI-RS-ResourceId) with CSI-RSRP above rsrp-ThresholdBFR amongst the CSI-RSs included in candidateBeamRSSCellList. Specifically, the candidateBeamRSSCellList may be configured in the cell that has detected beam failure. The length of the candidate RS ID field may be 6 bits.

The candidateBeamRSSCellList configured in a cell for beam failure recovery may include one or multiple candidate beam RS(s). Each configured candidate beam RS may be associated with a SSB or DL-RS (e.g., CSI-RS). Noted that the index of an associated DL RS (e.g., NZP-CSI-RS-ResourceId of a CSI-RS) may be configured with a value of 0-127. However, the length of the candidate RS ID field in an octet of a (Truncated) BFR MAC CE is 6 bits. Hence, it is not clear how UE can indicate a DL RS (e.g., CSI-RS) with an ID value larger than 63.

Another point is that the candidate beam RS(s) configured in candidateBeamRSSCellList may include SSB and/or DL-RS (e.g., CSI-RS). Hence, it may be possible that the candidateBeamRSSCellList configured in a cell for beam failure recovery may include two candidate beam RS(s) with the same index, e.g., SSB-Index of SSB equals the NZP-CSI-RS-ResourceId of a CSI-RS in the candidateBeamRSSCellList. In this case, indicating an index value in the candidate RS ID field may result in ambiguity because how to indicate the type of candidate beam RS (e.g., SSB or DL RS) remains unclear or unspecified. The ideas, concepts and embodiments throughout the present disclosure could be used to at least solve the above-mentioned issues. The ideas, concepts and embodiments throughout the present disclosure could also be used to similar issues with ambiguity in an indication signal.

Any combination of above concepts can be jointly combined or formed to a new embodiment. The following embodiments can be used to solve at least (but not limited to) the issue mentioned above.

The present disclosure may at least comprise the following concepts or implementations.

Concept/Implementation 1: indicated value of bitmap of Candidate RS ID field may correspond to the order of element configured in Candidate beam RS list.

A UE may transmit a MAC-CE for SCell BFR for a SCell (e.g., when beam failure is detected on the SCell). Moreover, the MAC-CE may comprise a bitmap for indicating (identified) candidate beam at least for the SCell. The UE may be configured with a BFR configuration for the SCell. The BFR configuration may comprise a candidate beam list for BFR in the SCell. The candidate beam list may comprise one or more element(s), and preferably, the one or more element(s) may correspond to or be associated with one or more candidate beam RS(s) respectively. One candidate beam RS may be configured to be associated with a SSB or DL-RS (e.g., CSI-RS). The (bit) value indicated by the bitmap may correspond to one element included in the candidate beam list.

The (bit) value indicated by the bitmap may correspond to the order of element or candidate beam RS included in the candidate beam list.

The (bit) value indicated by the bitmap may not (directly) correspond to the index of DL RS or SSB associated with candidate beam RS included in the candidate beam list.

In one case, if or when beam failure has been detected on a SCell, the UE may select a SSB as a candidate beam amongst the SSBs in candidateBeamRSSCellList configured for the SCell if the SS-RSRP, as measured from the SSB, is above rsrp-ThresholdBFR.

In one case, if or when beam failure has been detected on a SCell, the UE may select a CSI-RS as a candidate beam amongst the CSI-RSs in candidateBeamRSSCellList configured for the SCell if the CSI-RSRP, as measured from the CSI-RS, is above rsrp-ThresholdBFR.

For one example, the smallest (bit) value indicated by the bitmap may correspond to the first element included in the candidate beam list, the second smallest (bit) value indicated by the bitmap may correspond to the second element in the candidate beam list, and so on. For one example, the smallest (bit) value indicated by the bitmap may correspond to an element included/configured in the candidate beam list with a first order, the second smallest (bit) value indicated by the bitmap may correspond to an element included/configured in the candidate beam list with a second order, and so on.

For one example, the candidate beam list may be candidateBeamRSSCellList-r16, and the one or more element(s) or candidate beam RS(s) may be CandidateBeamRS-r16, as shown in the Table 1.

TABLE 1

BeamFailureRecoverySCellConfig information element

-- ASN1START
-- TAG-BEAMFAILURERECOVERYSCELLCONFIG-START

TABLE 1-continued

BeamFailureRecoverySCellConfig information element

```
BeamFailureRecoverySCellConfig-r16 ::= SEQUENCE {
    rsrp-ThresholdBFR-r1              RSRP-Range
OPTIONAL, -- Need M
    candidateBeamRSSCellList-r16      SEQUENCE (SIZE(1..maxNrofCandidateBeams-r16)) OF
CandidateBeamRS-r16      OPTIONAL, -- Need M
    ...
}
CandidateBeamRS-r16 ::=               SEQUENCE {
    candidateBeamConfig-r16               CHOICE {
        ssb-r16                               SSB-Index,
        csi-RS-r16                            NZP-CSI-RS-ResourceId
    },
    servingCellId                     ServCellIndex
OPTIONAL -- Need R
}
-- TAG-BEAMFAILURERECOVERYSCELLCONFIG-STOP
-- ASN1STOP
```

For one example, the MAC-CE may be at least one of the two MAC-CEs shown in FIG. 1. FIG. 1 shows a schematic diagram of two MAC-CEs according to an example implementation of the present disclosure. The bitmap may be Candidate RS ID field. FIG. 1 may be at least used to show a schematic diagram of two MAC-CEs according to an exemplary implementation of the present disclosure. FIG. 1(a) can show a BFR MAC CE with the highest ServCellIndex of this MAC entity's SCell configured with BFD is less than 8. FIG. 1(b) can show a BFR MAC CE with the highest ServCellIndex of this MAC entity's SCell configured with BFD is equal to or higher than 8.

The length of Candidate RS ID field may be 6 bits.

For one example, (bit) value "000000" indicated by the Candidate RS ID field associated with the serving cell may correspond to the first element configured or included in the candidateBeamRSSCellList-r16 configured for the serving cell.

For one example, (bit) value "000001" indicated by the Candidate RS ID field associated with the serving cell may correspond to the second element configured or included in the candidateBeamRSSCellList-r16 configured for the serving cell.

For one example, a UE may be configured (via RRC signaling) with a configuration (e.g., BeamFailureRecovery-SCellConfig-r16 IE) for SCell 1. The configuration may comprise a candidate beam list (e.g., candidateBeamRSSCellList-r16 IE) for SCell 1. In this example, the candidate beam list comprises 2 element(s)/candidate beam RS(s). The first or the most significant element/candidate beam RS(s) within the candidate beam list may correspond to a SSB with SSB-Index=1 and/or the second or the second most significant element/candidate beam RS(s) may correspond to a CSI-RS with NZP-CSI-RS-ResourceId=2 within the candidate beam list.

In one case, if or when the UE detects beam failure for SCell 1 and selects SSB-Index=1 as the candidate beam RS (e.g., the SS-RSRP detected from the SSB with SSB-Index=1 is above a RSRP threshold, rsrp-ThresholdBFR, as configured in the BFR configuration for SCell 1), the UE may report a (truncated) BFR MAC CE. Moreover, the Candidate RS ID field associated with SCell 1 within the reported (truncated) BFR MAC CE may have a value of "000000".

In another case, if or when the UE detects beam failure for SCell 1 and selects NZP-CSI-RS-ResourceId=2 as the candidate beam RS (e.g., the CSI-RSRP detected from the CSI-RS with CSI NZP-CSI-RS-ResourceId=2 is above a RSRP threshold, rsrp-ThresholdBFR, as configured in the BFR configuration for SCell 1), the UE may report a (truncated) BFR MAC CE. Moreover, the Candidate RS ID field associated with SCell 1 within the reported (truncated) BFR MAC CE may have a value of "000001".

Concept/Implementation 2: Candidate beam RS configuration (e.g., CandidateBeamRS-r16) may include a candidate beam RS ID; Candidate beam RS list (e.g., candidateBeamRSSCellList-r16) may include one or more candidate beam RS ID(s), each of which may correspond to a Candidate beam RS (configuration).

A UE may transmit a MAC-CE for SCell BFR for a SCell (e.g., if beam failure is detected on the SCell). Moreover, the MAC-CE may comprise a bitmap for indicating (identified) candidate beam at least for the SCell. The UE may be configured with a BFR configuration for the SCell. The BFR configuration may comprise a candidate beam list for BFR in the SCell. The candidate beam list may comprise one or more element(s), and the one or more element(s) may correspond to or be associated with one or more candidate beam RS(s) respectively. The (bit) value indicated by the bitmap may correspond to one element included in the candidate beam list.

In one implementation, a candidate beam RS ID (e.g., identified or indicated by candidateBeamRSId-r16) associated with the candidate beam RS may be configured in the IE of the candidate beam RS (e.g., CandidateBeamRS-r16 IE).

In one implementation, a candidate beam RS ID list (e.g., candidateBeamRSIdList-r16) may be configured, and this list may include one or multiple entries. Each entry may include one candidate beam RS ID. Moreover, the number of entries of the candidate beam RS ID list may have the same number of entries of the candidate beam list (e.g., candidateBeamRSSCellList-r16 IE). Moreover, the candidate beam RS ID in the first element of the candidate beam RS ID list may be associated with the candidate beam RS in the first element of the candidate beam list, the candidate beam RS ID in the second element of the candidate beam RS ID list may be associated with the candidate beam RS in the second element of the candidate beam list, and so on.

The candidate beam RS may be configured with a candidate beam RS ID. The candidate beam RS may be associated with a DL RS (e.g., CSI-RS) or an SSB. The candidate beam RS ID may not be the same as the index of associated DL RS or SSB.

The candidate beam RS list may comprise one or more candidate beam RS ID, and the one or more candidate beam RS ID may correspond to one or more candidate beam RS respectively. The candidate beam RS list may not comprise all parameters corresponding to or configured for the one or more candidate beam RS respectively.

One implementation may be shown in Table 2.

TABLE 2

One possible RRC structure for this concept/implementation

```
-- ASN1START
-- TAG-BEAMFAILURERECOVERYSCELLCONFIG-START
BeamFailureRecoverySCellConfig-r16 ::= SEQUENCE {
    rsrp-ThresholdBFR-r16                   RSRP-Range
OPTIONAL, -- Need M
    candidateBeamRSSCellList-r16            SEQUENCE (SIZE(1..maxNrofCandidateBeams-r16)) OF
CandidateBeamRS-r16       OPTIONAL, -- Need M
    ...
}
CandidateBeamRS-r16 ::=                     SEQUENCE {
    candidateBeamRSId-r16
    candidateBeamConfig-r16                 CHOICE {
        ssb-r16                             SSB-Index,
        csi-RS-r16                          NZP-CSI-RS-ResourceId
    },
    servingCellId                           ServCellIndex
OPTIONAL -- Need R
}
-- TAG-BEAMFAILURERECOVERYSCELLCONFIG-STOP
-- ASN1STOP
```

One implementation may be shown in Table 3.

TABLE 3

One possible RRC structure for this concept/implementation

```
-- ASN1START
-- TAG-BEAMFAILURERECOVERYSCELLCONFIG-START
BeamFailureRecoverySCellConfig-r16 ::= SEQUENCE {
    rsrp-ThresholdBFR-r16                   RSRP-Range
OPTIONAL, -- Need M
    candidateBeamRSSCellList-r16            SEQUENCE (SIZE(1..maxNrofCandidateBeams-r16)) OF
CandidateBeamRS-r16      OPTIONAL, -- Need M
    candidateBeamRSIdList-r16               SEQUENCE (SIZE(1..maxNrofCandidateBeams-r16)) OF
CandidateBeamRSId-r16      OPTIONAL, -- Need M
    ...
}
CandidateBeamRS-r16 ::=                     SEQUENCE {
    candidateBeamConfig-r16                 CHOICE {
        ssb-r16                             SSB-Index,
        csi-RS-r16                          NZP-CSI-RS-ResourceId
    },
    servingCellId                           ServCellIndex
OPTIONAL -- Need R
}
-- TAG-BEAMFAILURERECOVERYSCELLCONFIG-STOP
-- ASN1STOP
```

The (bit) value indicated by the bitmap may correspond to the candidate beam RS ID included in the candidate beam list.

The (bit) value indicated by the bitmap may not correspond to the index of DL RS (e.g., CSI-RS) or SSB associated with candidate beam RS included in the candidate beam list.

Figure 2:
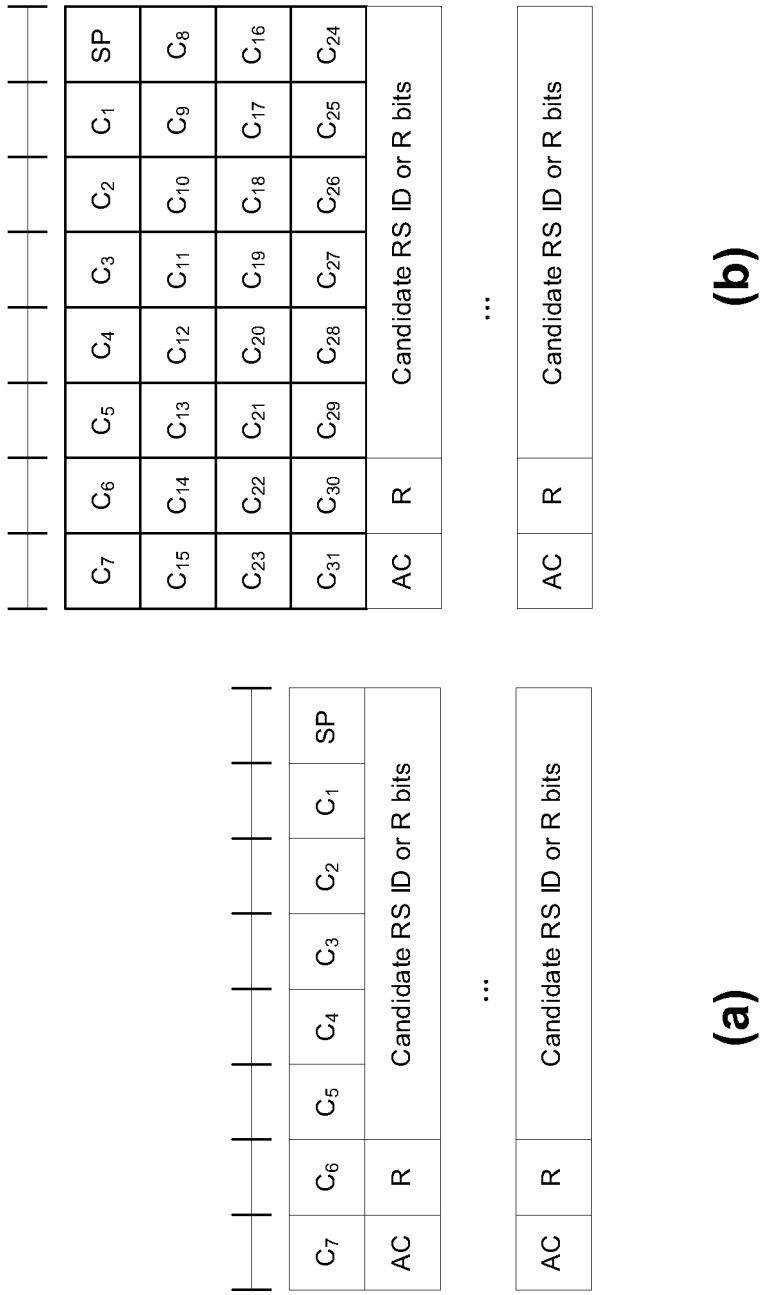
FIG. 2 shows a schematic diagram of BFR MAC-CE according to an example implementation of the present disclosure.

One possible implementation may be shown in Table 4 and FIG. 2. FIG. 2 shows a schematic diagram of BFR MAC-CE according to an example implementation of the present disclosure. FIG. 2(a) shows BFR and Truncated BFR MAC CE with single octet bitmap. FIG. 2(b) shows BFR and Truncated BFR MAC CE with four octets bitmap.

TABLE 4

One possible MAC-CE for this concept/implementation

BFR MAC CEs
The MAC CEs for BFR consists of either:

TABLE 4-continued

One possible MAC-CE for this concept/implementation

- BFR MAC CE; or
- Truncated BFR MAC CE.

The BFR MAC CE and Truncated BFR MAC CE are identified by a MAC subheader with LCID/eLCID. The BFR MAC CE and Truncated BFR MAC CE have a variable size. They include a bitmap and in ascending order based on the ServCellIndex, beam failure recovery information i.e., octets containing candidate beam availability indication (AC) for SCells indicated in the bitmap. For BFR MAC CE, a single octet bitmap is used when the highest ServCellIndex of this MAC entity's SCell for which beam failure is detected is less than 8, otherwise four octets are used. A MAC PDU shall contain at most one BFR MAC CE.

For Truncated BFR MAC CE, a single octet bitmap is used for the following cases, otherwise four octets are used:
- the highest ServCellIndex of this MAC entity's SCell for which beam failure is detected is less than 8; or
- beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:
- SP: This field indicates beam failure detection for the SpCell of this MAC entity. The SP field is set to 1 to indicate that beam failure is detected for SpCell only when BFR MAC CE or Truncated BFR MAC CE is to be included into a MAC PDU as part of Random Access Procedure, otherwise, it is set to 0.
- $C_i$ (BFR MAC CE): This field indicates beam failure detection and the presence of an octet containing the AC field for the SCell with ServCellIndex i as specified in TS 38.331 [5]. The $C_i$ field set to 1 indicates that beam failure is detected and the octet containing the AC field is present for the SCell with ServCellIndex i. The $C_i$ field set to 0 indicates that the beam failure is not detected and octet containing the AC field is not present for the SCell with ServCellIndex i. The octets containing the AC field are present in ascending order based on the ServCellIndex;
- $C_i$ (Truncated BFR MAC CE): This field indicates beam failure detection for the SCell with ServCellIndex i as specified in TS 38.331 [5]. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size;
NOTE: The number of the octets containing the AC field in the Truncated BFR MAC CE can be zero.
- AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;
- Candidate RS ID: This field is set to the index candidateBeamRSId-r16 of a candidate beam RS configuration associated with an SSB with SS-RSRP above rsrp-ThresholdBFR amongst the SSBs in candidateBeamRSSCellList or a CSI-RS with CSI-RSRP above rsrp-ThresholdBFR amongst the CSI-RSs in candidateBeamRSSCellList. The length of this field is 6 bits.
- R: Reserved bit, set to 0.

For one example, (bit) value "000000" indicated by the Candidate RS ID field, which is associated with the serving cell, may correspond to a candidate beam RS configured or included in the candidateBeamRSSCellList-r16 configured for the serving cell, and the candidate beam RS is configured with index 0, e.g., provided by candidateBeamRSId-r16.

Concept/Implementation 3: one R bit included in an octet, corresponding to failed SCell, in SCell MAC-CE may indicate the identified candidate beam RS is SSB or CSI-RS; the range of index of CSI-RS configured as candidate beam RS may not be larger than 64.

A UE may transmit a MAC-CE for SCell BFR for a SCell (e.g., if beam failure is detected on the SCell). Moreover, the MAC-CE may comprise a bitmap for indicating (identified) candidate beam at least for the SCell. The UE may be configured with a BFR configuration for the SCell. The BFR configuration may comprise a candidate beam list for BFR in the SCell. The candidate beam list may comprise one or more element(s), and the one or more element(s) may correspond to or be associated with one or more candidate beam RS(s) respectively. The (bit) value indicated by the bitmap may correspond to one element included in the candidate beam list.

The bitmap may be included in an octet (associated with the SCell) in the MAC-CE. The octet may also comprise a field/bit (e.g., R/reserved field/bit). Furthermore, the field/bit (in the octet) may be used to indicate the type of identified candidate beam RS (e.g., SSB or a DL RS (e.g., CSI-RS)) indicated by the bitmap (in the same octet). More specifically, a first value in the field/bit (in the octet) may indicate the identified candidate beam RS indicated by the bitmap (in the same octet) is an SSB, and a second value (in the octet) in the field/bit may indicate the identified candidate beam RS indicated by the bitmap is a CSI-RS (in the same octet).

For example, if the field/bit indicates '0', the type of identified candidate beam RS may be SSB. Then, the indicated value of the bitmap may correspond to index of an SSB. If the field/bit indicates '1', the type of identified candidate beam RS may be DL RS (e.g., CSI-RS). Then, the indicated value of the bitmap may correspond to index of a DL RS (e.g., index of a CSI-RS). The type of identified candidate beam RS mapped to indicated value of the field/bit may be implemented in the opposite way.

If one DL RS (e.g., CSI-RS) is configured to be associated with a candidate beam RS in the candidate beam RS list, the index of the DL RS may not be larger than maximum value indicated by the bitmap (e.g., 63). This may imply that the UE does not expect the index of DL RS configured as a candidate beam RS is larger than 63. This may also imply that the network is not allowed to configure a DL RS as a candidate beam RS, wherein the index of the DL RS is larger than 63.

Concept/Implementation 4: network is not allowed to configure a SSB and a CSI-RS with the same index value in a Candidate beam RS list (e.g., candidateBeamRSSCellList-r16).

A UE may transmit a MAC-CE for SCell BFR for a SCell (e.g., if beam failure is detected on the SCell). Moreover, the MAC-CE may comprise a bitmap for indicating (identified) candidate beam at least for the SCell. The UE may be configured with a BFR configuration for the SCell. The BFR configuration may comprise a candidate beam list for BFR in the SCell. The candidate beam list may comprise one or more element(s), and the one or more element(s) may correspond to or be associated with one or more candidate beam RS(s) respectively. The (bit) value indicated by the bitmap may correspond to one element included in the candidate beam list.

One candidate beam RS may be configured to be associated with a SSB or a DL RS (e.g., CSI-RS). The UE may be configured with at least a first candidate beam RS and/or a second candidate beam RS in the candidate beam RS list. The first candidate beam RS may be configured as being associated with a first SSB/DL RS (e.g., CSI-RS). The second candidate beam RS may be configured as being associated with a second SSB/DL RS (e.g., CSI-RS). The UE may not expect that the index of the first SSB/CSI-RS associated with the first candidate beam RS is the same as the index of the second SSB/DL RS associated with the second candidate beam RS. The network may prevent from or may be not allowed to configure that the index of the SSB associated with the first candidate beam RS is the same as the index of DL RS associated with the second candidate beam RS. The network may prevent from or may not be allowed to configure a SSB or a DL-RS to be associated with the second candidate beam RS, if or when the index of the SSB/DL RS is the same as that of an SSB/DL-RS associated with the first candidate beam RS.

In one implementation, the index of each DL RS (e.g., NZP-CSI-RS-ResourceId) in the candidate beam RS list may be configured with a value of 64-127, and the index of each SSB (e.g., SSB-Index) configured in the candidate beam RS list may be configured with a value of 0-63. On the other hand, the bitmap for indicating candidate beam (e.g., Candidate RS ID field) from the (truncated) SCell MAC CE may be 7 bits. Moreover, this bitmap may be set to the index of an SSB with SS-RSRP above rsrp-ThresholdBFR amongst the SSBs in candidateBeamRSSCellList or to the index of a CSI-RS with CSI-RSRP above rsrp-Threshold-BFR amongst the CSI-RSs in candidateBeamRSSCellList.

The following descriptions could be applied for embodiments mentioned below.

A UE is configured with and/or served in a first serving cell by a network.

A UE is configured with and/or served in a second serving cell by a network.

The UE may be configured with one or more serving cells, which may include the first serving cell and/or the second serving cell.

The UE may be activated or be indicated to activate one or more serving cells, which may include the first serving cell and/or the second serving cell.

The UE may be configured and/or indicated one or more bandwidth part (BWP).

The UE may be indicated and/or activated a (active) BWP.

Preferably, the UE may be indicated and/or activated an active DL BWP.

Preferably, the UE may be indicated and/or activated an active UL BWP.

Preferably, the UE may be configured and/or indicated an initial BWP.

Preferably, the UE may be configured and/or indicated a default BWP.

Preferably, the first serving cell may be a secondary serving cell.

Preferably, the second serving cell may be a primary serving cell.

Preferably, the active DL BWP may be in the first serving cell.

Preferably, the active UL BWP may be in the first serving cell.

Preferably, the UE may be in RRC CONNECTED state.

Preferably, the UE may be in RRC INACTIVE state.

Preferably, the UE may be in RRC IDLE state.

Preferably, the UE may detect or identify beam failure occurs in the first serving cell.

Preferably, the beam failure occurring may be associated with the measurement result of a first resource set.

Preferably, the UE may be configured the first resource set for the first serving cell.

Preferably, the first resource set may be configured in the first serving cell.

Preferably, the first resource set may be associated with beam failure detection.

Preferably, the beam failure may be detected or identified, if or when some or all resource in the first resource set are detected that corresponding RS quality is below (or equal to) a first threshold.

Preferably, the first resource set may comprise one or more DL RS or SSB.

Preferably, the first resource set may comprise one or more DL RS or SSB, and the one or more DL RS or SSB are associated with beam failure or beam failure recovery or link recovery.

Preferably, the first resource set may comprise one or more RadioLinkMonitoringRS with purpose of "beam failure" and/or "radio link failure".

Preferably, the first resource set may be configured in beam failure recovery or link recovery related configuration, e.g., RadioLinkMonitoringConfig.

Preferably, the first resource set may be referred to or replaced with the first resource set list or the first resource list.

Preferably, the UE may be configured a second resource set for the first serving cell.

Preferably, the UE may identify a candidate beam or a candidate beam RS from the second resource set.

Preferably, a candidate beam or a candidate beam RS may be a DL RS, and/or a SSB in the second resource set.

Preferably, a candidate beam or a candidate beam RS may be a DL RS, and/or a SSB in the second resource set, whose measurement quality is above or equal to a second threshold.

Preferably, the second resource set may comprise one or more candidate beam(s) or candidate beam RS(s).

Preferably, the one or more candidate beam(s) or candidate beam RS(s) may be configured for beam failure recovery or link recovery for the first serving cell.

Preferably, the UE may detect or identify at least one candidate beam, which could be used to beam failure recovery or link recovery in the first serving cell.

Preferably, the second resource set may comprise one or more candidate beam RS configuration.

Preferably, the second resource set may comprise one or more candidate beam RS configuration, and each of them may be associated with index of a DL RS or SSB, and/or serving cell ID of a serving cell where the associated DL RS or SSB is transmitted.

Preferably, a candidate beam RS configuration may be associated with either a DL RS or an SSB.

Preferably, a candidate beam RS configuration may be referred to or replaced with a candidate beam configuration.

Preferably, a candidate beam RS configuration may be CandidateBeamRS-r16.

Preferably, the second resource set may comprise a first candidate beam RS configuration and/or a second candidate beam RS configuration.

Preferably, the second resource set may be candidate-BeamRSSCellList-r16.

Preferably, the second resource set may be configured in beam failure recovery or link recovery related configuration, e.g., BeamFailureRecoverySCellConfig or BeamFailureRecoveryConfig.

Preferably, the second resource set may be referred to or replaced with the second resource set list or the second resource list.

Preferably, the UE may detect or identify beam failure occurs in the second serving cell.

Preferably, the beam failure occurring may be associated with the measurement result of a third resource set.

Preferably, the UE may be configured the third resource set for the second serving cell.

Preferably, the third resource set may be configured in the second serving cell.

Preferably, the third resource set may be associated with beam failure detection.

Preferably, the beam failure may be detected or identified, if or when or wherein some or all resource in the third resource set are detected that corresponding RS quality is below (or equal to) a first threshold.

Preferably, the third resource set may comprise one or more DL RS or SSB.

Preferably, the third resource set may comprise one or more DL RS or SSB, wherein the one or more DL RS or SSB are associated with beam failure or beam failure recovery or link recovery.

Preferably, the third resource set may comprise one or more RadioLinkMonitoringRS with purpose of "beam failure" and/or "radio link failure".

Preferably, the third resource set may be configured in beam failure recovery or link recovery related configuration, e.g., RadioLinkMonitoringConfig.

Preferably, the third resource set may be referred to or replaced with the third resource set list or the third resource list.

Preferably, the UE may be configured a fourth resource set for the second serving cell.

Preferably, the UE may identify a candidate beam or a candidate beam RS from the fourth resource set.

Preferably, a candidate beam or a candidate beam RS may be a DL RS, and/or a SSB in the fourth resource set.

Preferably, a candidate beam or a candidate beam RS may be a DL RS, and/or a SSB in the fourth resource set, whose measurement quality is above or equal to a second threshold.

Preferably, the fourth resource set may comprise one or more candidate beam(s) or candidate beam RS(s).

Preferably, the one or more candidate beam(s) or candidate beam RS(s) may be configured for beam failure recovery or link recovery for the second serving cell.

Preferably, the UE may detect or identify at least one candidate beam, which could be used to beam failure recovery or link recovery in the second serving cell.

Preferably, the fourth resource set may comprise one or more candidate beam RS configuration.

Preferably, the fourth resource set may comprise one or more candidate beam RS configuration, wherein each of them may be associated with index of a DL RS or SSB, and/or serving cell ID of a serving cell where the associated DL RS or SSB is transmitted.

Preferably, a candidate beam RS configuration may be associated with either a DL RS or an SSB.

Preferably, a candidate beam RS configuration may be referred to or replaced with a candidate beam configuration.

Preferably, a candidate beam RS configuration may be PRACH-ResourceDedicatedBFR or BFR-SSB-Resource or BFR-CSIRS-Resource.

Preferably, the fourth resource set may comprise a third candidate beam RS configuration and/or a fourth candidate beam RS configuration.

Preferably, the fourth resource set may be candidate-BeamRSList or candidateBeamRSListExt-r16.

Preferably, the fourth resource set may be configured in beam failure recovery or link recovery related configuration, e.g., BeamFailureRecoverySCellConfig or BeamFailureRecoveryConfig.

Preferably, the fourth resource set may be referred to or replaced with the fourth resource set list or the fourth resource list.

Preferably, the UE may be configured, by a network, with at least one (SCell) BFR configuration for at least one (configured/activated) serving cell.

Preferably, the UE may be configured at least one BFR configuration for the first serving cell and/or the second serving cell.

Preferably, the UE may transmit a signal to the network, wherein the signal may be associated with BFR for at least the first serving cell and/or the second serving cell.

Preferably, the signal may be MAC-CE, or DCI or RRC parameter.

Preferably, the UE may transmit the signal, wherein or when or if the UE detects or identifies beam failure occurs in the first serving cell and/or that occurs in the second serving cell.

Preferably, the signal may comprise at least a bitmap related to the first serving cell. Preferably, the signal or bitmap may indicate whether a candidate beam is detected or identified for the first serving cell.

Preferably, the signal or bitmap may indicate information (e.g., ID, index) of or associated with a candidate beam, if detected or identified, for the first serving cell.

Embodiment 1

One embodiment is described as follows.

Preferably, the (bit) value indicated by the bitmap may be mapped to or correspond to the (configuring) order of the one or more candidate beam RS configuration in the second resource set.

Preferably, the (bit) value indicated by the bitmap may not correspond to or may have nothing to do with index of DL RS or SSB associated with candidate beam RS configuration in the second resource set.

Preferably, the (bit) value indicated by the bitmap may not be the same as index of DL RS or SSB associated with the identified or detected candidate beam RS configuration in the second resource set.

One exemplary implementation of this embodiment may be as follows.

Figure 3:
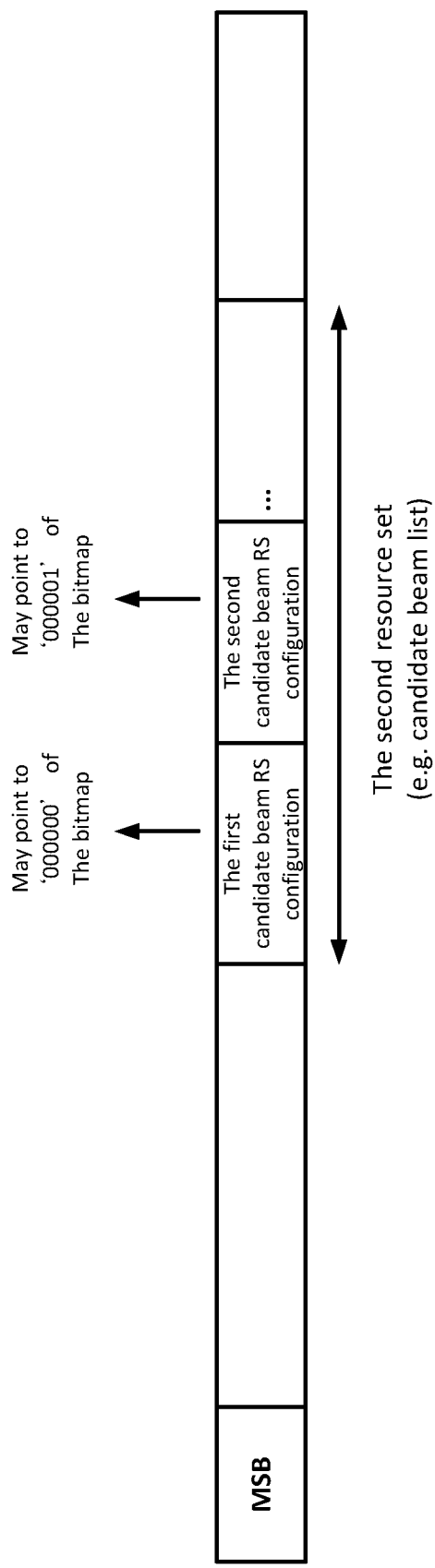
FIG. 3 shows a schematic diagram of configuration bit stream including the second resource set according to an example implementation of the present disclosure.

FIG. 3 shows a schematic diagram of configuration bit stream including the second resource set according to an example implementation of the present disclosure. FIG. 3 may be at least used to show a schematic diagram of configuration bit stream including the second resource set according to an example implementation of the present disclosure. The UE may receive configuration bit stream including the second resource set as shown in FIG. 3. The bit length of the bitmap may be 6 bits. The first candidate beam RS configuration and the second candidate beam RS configuration are located at the most and the second most significant bit position of the second resource set. As shown below, the detected or identified candidate beam RS may be the DL RS or SSB associated with the first candidate beam RS configuration, when or if or wherein the bitmap indicates '000000'. The detected or identified candidate beam RS may be the DL RS or SSB associated with the second candidate beam RS configuration, when or if or wherein the bitmap indicates '000001'.

Embodiment 2

Another one embodiment is described as follows.

Preferably, a candidate beam RS (configuration) in the second resource set may be associated with a candidate beam RS ID.

Preferably, the UE may be configured or indicated a candidate beam RS ID, which may be configured in the candidate beam RS configuration.

Preferably, the UE may be configured or indicated a RS ID list, which may be (mutually) referred to a candidate beam RS ID list.

Preferably, the candidate beam RS ID list may be configured in the candidate beam RS configuration.

Preferably, the candidate beam RS ID list may comprise one or more candidate beam RS ID(s).

Preferably, a candidate beam RS ID(s) in the candidate beam RS ID list may be associated with a candidate beam configuration in the second resource set with a one-to-one mapping.

Preferably, a candidate beam RS ID(s) in the candidate beam RS ID list may be associated with a candidate beam configuration in the second resource set in ascending or descending order of elements/entries.

For example, the first element/entry, associated with a candidate beam RS ID, of candidate beam RS ID list may be mapped to the first element/entry, associated with a candidate beam RS, in the second resource set.

For example, the second element/entry, associated with a candidate beam RS ID, of candidate beam RS ID list may be mapped to the second element/entry, associated with a candidate beam RS, in the second resource set.

Preferably, the candidate beam RS ID could be referred to or replaced with the candidate beam RS configuration ID.

Preferably, different candidate beam RS configuration may be associated with different candidate beam RS configuration ID.

Preferably, a candidate beam RS ID of a candidate beam RS configuration may be different from the ID of DL RS or SSB associated with the candidate beam RS configuration.

For example, for a candidate beam RS configuration, the candidate beam RS ID may be '000000', and the ID of SSB associated with the candidate beam RS configuration may be '101010'.

Preferably, the (bit) value indicated by the bitmap may be mapped to or correspond to the candidate beam RS ID associated with the detected or identified candidate beam RS configuration in the second resource set.

Preferably, the (bit) value indicated by the bitmap may not correspond to or may have nothing to do with index of DL RS or SSB associated with the detected or identified candidate beam RS configuration in the second resource set.

Preferably, the (bit) value indicated by the bitmap may not be the same as index of DL RS or SSB associated with the identified or detected candidate beam RS configuration in the second resource set.

Embodiment 3

Another one embodiment is described as follows.

Preferably, the bitmap may indicate or convey that the type of detected or identified candidate beam (RS).

Preferably, the bitmap may indicate or convey that the type of the DL RS or SSB associated with the detected or identified candidate beam RS configuration.

Preferably, a field or bit may indicate or convey that the type of detected or identified candidate beam (RS) (e.g., DL RS or SSB).

Preferably, a field or bit may indicate or convey that the type of the detected or identified candidate beam RS configuration (e.g., DL RS or SSB).

Preferably, the field or bit may be associated with the first serving cell.

Preferably, the field or bit may be carried or included in the bitmap.

Preferably, the field or bit may be associated with the bitmap.

Preferably, the field or bit may be used as a reservation field or bit.

Preferably, a first value and/or a second value of a field or bit may indicate or convey that the type of the detected or identified candidate beam (RS) (e.g., DL RS or SSB).

Preferably, a first value and/or a second value of a field or bit may indicate or convey that the type of the detected or identified candidate beam RS configuration (e.g., DL RS or SSB).

Preferably, the type of detected or identified candidate beam RS (configuration) may be an SSB, if or when or wherein the first value is indicated by the field or bit.

Preferably, the type of detected or identified candidate beam RS (configuration) may be a DL (e.g., CSI-RS), if or when or wherein the second value is indicated by the field or bit.

Preferably, the first value may be 0, and the second value is 1.

Alternatively or additionally, the first value may be 1, and the second value is 0.

For example, the type of identified candidate beam RS may be SSB, wherein or when or if the field/bit indicates '0'. The identified candidate beam RS configuration may be associated with SSB, wherein or when or if the field/bit indicates '0'. Then, the indicated value of the bitmap may indicate index of an SSB.

For example, the type of identified candidate beam RS may be DL RS (e.g., CSI-RS), wherein or when or if the field/bit indicates '1'. The identified candidate beam RS configuration may be associated with DL RS (e.g., CSI-RS), wherein or when or if the field/bit indicates '1'. Then, the indicated value of the bitmap may indicate index of a DL RS (e.g., CSI-RS). The type of identified candidate beam RS mapped to indicated value of the field/bit may be implemented in the opposite way.

Embodiment 4

Another one embodiment is described as follows.

Preferably, the first candidate beam RS configuration may be associated with a first SSB or DL RS (e.g., CSI-RS).

Preferably, the second candidate beam RS configuration may be associated with a second SSB or DL RS (e.g., CSI-RS).

Preferably, the UE may not expect that the index of the first SSB/CSI-RS is the same as the index of the second SSB or DL RS.

Preferably, the network may prevent from or may be not allowed to configure that the index of the first SSB or DL RS is the same as the index of the second SSB or DL RS.

Preferably, the network may prevent from or may not be allowed to configure a SSB or a DL RS to be associated with the second candidate beam RS, if or when or wherein the index of the SSB/DL RS is the same as that of a SSB or DL-RS associated with the first candidate beam RS.

Preferably, the network may prevent from or may not be allowed to configure the second candidate beam RS configuration (into the second resource set), if or when or wherein the index of the second SSB or DL RS is the same as the index of the first SSB or DL RS.

Preferably, the network may prevent from or may not be allowed to configure two candidate beam RS configuration in the second resource set, wherein or when or if the respective index of SSB or DL RS associated with each of them are the same.

Preferably, the network may prevent from or may not be allowed to configure two candidate beam RS configuration in the second resource set, wherein or when or if
one candidate beam RS configuration is associated with a SSB and the other one is associated with a DL RS, and
the index of the SSB and that of the DL RS are the same.

Preferably, the ID of a SSB may be within a first range, if or when or wherein the SSB is associated with a candidate beam RS (configuration) in the second resource set.

Preferably, the ID of a DL RS (e.g., CSI-RS) may be within a second range, if or when or wherein the SSB is associated with a candidate beam RS (configuration) in the second resource set.

Preferably, the first range and the second range may be orthogonal or non-overlapped.

Preferably, the first range may be [0, 63].

Preferably, the second range may be [64, 127].

Preferably, the number of (candidate) values among the first range may be the same as that among the second rage.

Preferably, the first range and/or the second range may be configured by the network.

For one example, the length of the bitmap may be ceiling (log (maximum value among the first range and/or the second range)), e.g., 7 bits. The type of identified candidate beam RS may be a SSB, wherein or when or if the indicated value of the bitmap is within the first range (e.g. [0, 63]). In the same example, the indicated value of the bitmap may correspond to the index of the SSB.

For one example, the length of the bitmap may be ceiling (log (maximum value among the first range and/or the second range)), e.g., 7 bits. The type of identified candidate beam RS may be a DL RS (e.g., CSI-RS), wherein or when or if the indicated value of the bitmap is within [64, 127]. In the same example, the indicated value of the bitmap may correspond to the index of the DL RS (e.g., CSI-RS).

Embodiment 5

Another one embodiment is described as follows.

Preferably, the UE may not expect that the index of a SSB or DL RS (e.g., CSI-RS) is larger than a value.

Preferably, the UE may not expect that the index of a SSB or DL RS (e.g., CSI-RS) is larger than a value, wherein or when or if the SSB or DL RS is associated with or configured in a candidate beam RS configuration.

Preferably, the UE may not expect that a SSB or DL RS (e.g., CSI-RS) is associated with or configured in a candidate beam RS configuration, wherein or when or if the index of the SSB or DL RS (e.g., CSI-RS) is larger than a value.

Preferably, the network may prevent from or may be not allowed to configure or associate a SSB or DL RS (e.g., CSI-RS) in a candidate beam RS configuration.

Preferably, the network may prevent from or may be not allowed to configure or associate a SSB or DL RS (e.g., CSI-RS) in a candidate beam RS configuration, wherein the index of the DL RS (e.g., CSI-RS) is larger than a value.

Preferably, the value is 63 or 64.

Preferably, the value is 127 or 128.

Preferably, the value is the maximum candidate value of index of an SSB.

Embodiment 6

Another one embodiment is described as follows.

Preferably, the UE may expect that the type of one or more candidate beam or candidate beam RS(s) in the second resource set are the same.

Preferably, the UE may not expect that the type of one or more candidate beam or candidate beam RS(s) in the second resource set are different.

Preferably, the UE may not expect that some candidate beam RS configuration(s) in the second resource set are associated with SSB, and other candidate beam RS configuration(s) in the second resource set are associated with DL RS (e.g., CSI-RS).

Preferably, the network may prevent from or may not be allowed to configure that the type of one or more candidate beam or candidate beam RS(s) in the second resource set are the same.

Preferably, the network may be required or forced to configure that the type of one or more candidate beam or candidate beam RS(s) in the second resource set are different.

Preferably, the network may prevent from or may not be allowed to configure that some candidate beam RS configuration(s) in the second resource set are associated with SSB, and other candidate beam RS configuration(s) in the second resource set are associated with DL RS (e.g., CSI-RS).

For one example, the UE may be configured with a candidateBeamRSSCellList-r16, which may comprise one or more CandidateBeamRS-r16, wherein each CandidateBeamRS-r16 is associated with SSB.

For one example, the UE may be configured with a candidateBeamRSSCellList-r16, which may comprise one or more CandidateBeamRS-r16, wherein each CandidateBeamRS-r16 is associated with DL RS (e.g., CSI-RS).

Preferably, the type of one or more candidate beam or candidate beam RS(s) in the fourth resource set may be different.

Preferably, some candidate beam RS configuration(s) in the fourth resource set may be associated with SSB, and other candidate beam RS configuration(s) in the fourth resource set may be associated with DL RS (e.g., CSI-RS).

Preferably, the network may be allowed to configure that the type of one or more candidate beam or candidate beam RS(s) in the fourth resource set are different.

Preferably, the network may be allowed to configure that some candidate beam RS configuration(s) in the fourth resource set are associated with SSB, and other candidate beam RS configuration(s) in the fourth resource set are associated with DL RS (e.g., CSI-RS).

Preferably, the signal may comprise another one bitmap related to the second serving cell.

Preferably, the signal or the another one bitmap may indicate whether a candidate beam is detected or identified for the second serving cell.

Preferably, the signal or the another one bitmap may indicate information (e.g., ID, index) of or associated with a candidate beam, if detected or identified, for the second serving cell.

Preferably, the another one bitmap may be the same as the bitmap (as mentioned above).

Preferably, the UE may prevent from or may not be allowed to indicate an ID or index value of a DL RS (e.g., CSI-RS) or SSB associated with identified candidate beam RS (configuration), which is different from the ID or index value of a DL RS (e.g., CSI-RS) or SSB that the UE uses to select PRACH resource for transmitting a BFRQ.

Alternatively or additionally, the UE may prevent from or may not be allowed to indicate candidate beam RS ID field for the second serving cell.

Alternatively or additionally, the UE may prevent from or may not be allowed to include the another one bitmap in the signal.

Alternatively or additionally, the UE may prevent from or may not be allowed to include a bitmap or an octet in the signal to indicate a candidate beam RS ID field or information for the second serving cell, if any.

It is noted that throughout the present disclosure, a detected or identified candidate beam RS configuration may mean that a DL RS or SSB associated with the detected or identified candidate beam RS configuration may be above the second threshold.

It is noted that throughout the present disclosure, the first threshold may be rlmInSyncOutOfSyncThreshold.

It is noted that throughout the present disclosure, the second threshold may be rsrp-ThresholdSSB or rsrp-ThresholdSSBBFR.

It is noted that throughout the present disclosure, the mentioned DL RS may be referred to as CSI-RS, or DM-RS, or PT-RS, or PSS or SSS.

It is noted that some or all of the above embodiments could be combined to form a new or another one embodiment.

Figure 4:
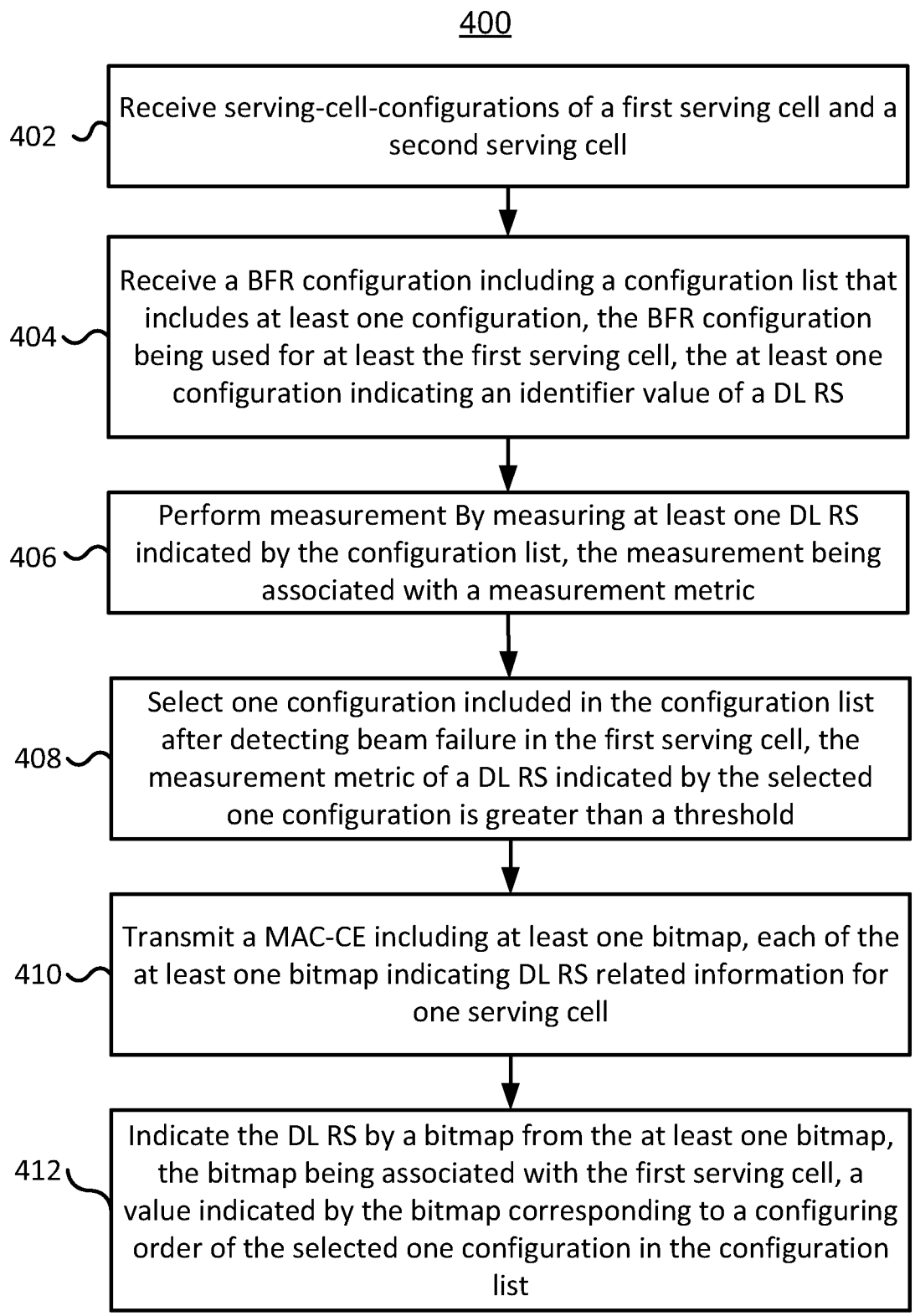
FIG. 4 is a flowchart illustrating a method for a UE in a wireless communication system according to an example implementation of the present disclosure.

FIG. 4 is a flowchart illustrating a method 400 for a UE for wireless communication in a wireless communication system according to an example implementation of the present disclosure.

In action 402, the UE may receive serving-cell-configurations of a first serving cell and a second serving cell. The UE may be configured with or be served in more than one serving cell (e.g., a first serving cell and a second serving cell). The UE may receive serving-cell-configurations of more than one serving cell (e.g., a first serving cell and a second serving cell). In one embodiment, the first serving cell may be a secondary serving cell, and/or the second serving cell may be a primary serving cell.

In action 404, the UE may receive a Beam Failure Recovery (BFR) configuration including a configuration list. The BFR configuration may be used for at least the first serving cell. The configuration list may include at least one configuration. Each of the at least one configuration may indicate an identifier value of a Downlink Reference Signal (DL RS). In one embodiment, the configuration list may be a candidate beam list (e.g., candidateBeamRSSCellList-r16 IE). The at least one configuration may be at least one element (e.g., CandidateBeamRS-r16) included in the candidate beam list. In one embodiment, the DL RS may be at least one of the followings: CSI-RS or SSB.

In action 406, the UE may perform measurement by measuring at least one DL RS indicated by the configuration list. The measurement may be associated with a measurement metric. In one embodiment, the measurement metric may be at least one of the followings: SS-RSRP or CSI-RSRP.

In action 408, the UE may select one configuration included in the configuration list after detecting beam failure in the first serving cell. The measurement metric of a DL RS indicated by the selected one configuration may be greater than a threshold. In one embodiment, the threshold may be rsrp-ThresholdBFR.

In action 410, the UE may transmit a Medium Access Control-Control Element (MAC-CE), which may include at least one bitmap. Each of the at least one bitmap may indicate DL RS related information for one serving cell.

In action 412, the UE may indicate the DL RS by a bitmap from the at least one bitmap. The bitmap may be associated with the first serving cell. The (bit) value indicated by the bitmap may correspond to a configuring order of the selected one configuration in the configuration list. In one embodiment, the (bit) value indicated by the bitmap does not refer to the identifier value of the DL RS. In one embodiment, the bitmap may comprise 6 bits. In one embodiment, the (bit) value indicated by the bitmap may corresponds to the configuring order of the selected configuration in the configuration list in an ascending way. In another one embodiment, the (bit) value indicated by the bitmap may corresponds to the configuring order of the selected configuration in the configuration list in a descending way.

A UE may implement one or more of the following points shown in Table 5.

Table 5

| Physical Layer |
|---|

5.1    Waveform, numerology and frame structure

Figure 5:
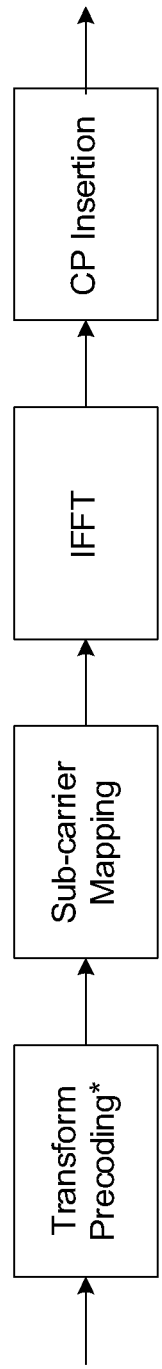
FIG. 5 shows one of possible implementations of a transmitter block diagram for cyclic prefix-orthogonal frequency division multiplexing (CP-OFDM) with optional discrete fourier transform (DFT)-spreading according to an example implementation of the present disclosure.

The downlink transmission waveform is conventional OFDM using a cyclic prefix. The uplink transmission waveform is conventional OFDM using a cyclic prefix with a transform precoding function performing DFT spreading that can be disabled or enabled. For operation with shared spectrum channel access, the uplink transmission waveform subcarrier mapping can map to subcarriers in one or more PRB interlaces. FIG. 5 shows one of possible implementations of a transmitter block diagram for CP-OFDM with optional DFT-spreading according to an example implementation of the present disclosure.

The numerology is based on exponentially scalable sub-carrier spacing $\Delta f = 2^\mu \times 15$ kHz with $\mu=\{0,1,3,4\}$ for PSS, SSS and PBCH and $\mu=\{0,1,2,3\}$ for other channels. Normal CP is supported for all sub-carrier spacings, Extended CP is supported for $\mu=2$. 12 consecutive sub-carriers form a Physical Resource Block (PRB). Up to 275 PRBs are supported on a carrier. Supported transmission numerologies are shown in Table 5.1.

Table 5.1: Supported transmission numerologies.

| $\mu$ | $\Delta f = 2^\mu \cdot 15 [kHz]$ | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

The UE may be configured with one or more bandwidth parts on a given component carrier, of which only one can be active at a time. The active bandwidth part defines the UE's operating bandwidth within the cell's operating bandwidth. For initial access, and until the UE's configuration in a cell is received, initial bandwidth part detected from system information is used.

Downlink and uplink transmissions are organized into frames with 10 ms duration, consisting of ten 1 ms subframes. Each frame is divided into two equally-sized half-frames of five subframes each. The slot duration is 14 symbols with Normal CP and 12 symbols with Extended CP, and scales in time as a function of the used sub-carrier spacing so that there is always an integer number of slots in a subframe.

Figure 6:
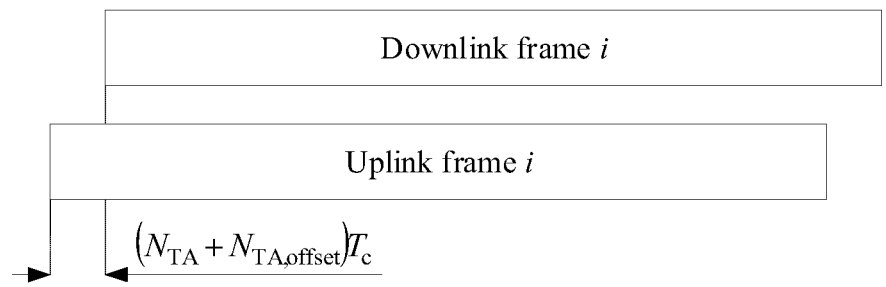
FIG. 6 shows an uplink-downlink timing relation according to an example implementation of the present disclosure.

Timing Advance *TA* is used to adjust the uplink frame timing relative to the downlink frame timing. FIG. 6 shows an uplink-downlink timing relation according to an example implementation of the present disclosure.

Operation on both paired and unpaired spectrum is supported.

5.2    Downlink 5.2.1    Downlink transmission scheme

A closed loop Demodulation Reference Signal (DMRS) based spatial multiplexing is supported for Physical Downlink Shared Channel (PDSCH). Up to 8 and 12 orthogonal DL DMRS ports are supported for type 1 and type 2 DMRS respectively. Up to 8 orthogonal DL DMRS ports per UE are supported for SU-MIMO and up to 4 orthogonal DL DMRS ports per UE are supported for MU-MIMO. The number of SU-MIMO code words is one for 1-4 layer transmissions and two for 5-8 layer transmissions.

The DMRS and corresponding PDSCH are transmitted using the same precoding matrix and the UE does not need to know the precoding matrix to demodulate the transmission. The transmitter may use different precoder matrix for different parts of the transmission bandwidth, resulting in frequency selective precoding. The UE may also assume that the same precoding matrix is used across a set of Physical Resource Blocks (PRBs) denoted Precoding Resource Block Group (PRG).

Transmission durations from 2 to 14 symbols in a slot is supported.

Aggregation of multiple slots with Transport Block (TB) repetition is supported.

5.2.2 Physical-layer processing for physical downlink shared channel

The downlink physical-layer processing of transport channels consists of the following steps:

- Transport block CRC attachment;
- Code block segmentation and code block CRC attachment;
- Channel coding: LDPC coding;
- Physical-layer hybrid-ARQ processing;
- Rate matching;
- Scrambling;
- Modulation: QPSK, 16QAM, 64QAM and 256QAM;
- Layer mapping;
- Mapping to assigned resources and antenna ports.

The UE may assume that at least one symbol with demodulation reference signal is present on each layer in which PDSCH is transmitted to a UE, and up to 3 additional DMRS can be configured by higher layers.

Phase Tracking RS may be transmitted on additional symbols to aid receiver phase tracking.

The DL-SCH physical layer model is described in TS 38.202 [20].

5.2.3 Physical downlink control channels

The Physical Downlink Control Channel (PDCCH) can be used to schedule DL transmissions on PDSCH and UL transmissions on PUSCH, where the Downlink Control Information (DCI) on PDCCH includes:

- Downlink assignments containing at least modulation and coding format, resource allocation, and hybrid-ARQ information related to DL-SCH;
- Uplink scheduling grants containing at least modulation and coding format, resource allocation, and hybrid-ARQ information related to UL-SCH.

In addition to scheduling, PDCCH can be used to for

- Activation and deactivation of configured PUSCH transmission with configured grant;
- Activation and deactivation of PDSCH semi-persistent transmission;
- Notifying one or more UEs of the slot format;
- Notifying one or more UEs of the PRB(s) and OFDM symbol(s) where the UE may assume no transmission is intended for the UE;
- Transmission of TPC commands for PUCCH and PUSCH;
- Transmission of one or more TPC commands for SRS transmissions by one or more UEs;

- Switching a UE's active bandwidth part;
- Initiating a random access procedure;
- Indicating the UE(s) to monitor the PDCCH during the next occurrence of the DRX on-duration.

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH.

Each resource element group carrying PDCCH carries its own DMRS.

QPSK modulation is used for PDCCH.

5.2.4 Synchronization signal and PBCH block

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS as show in Figure 5.2.4-1. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Figure 7:
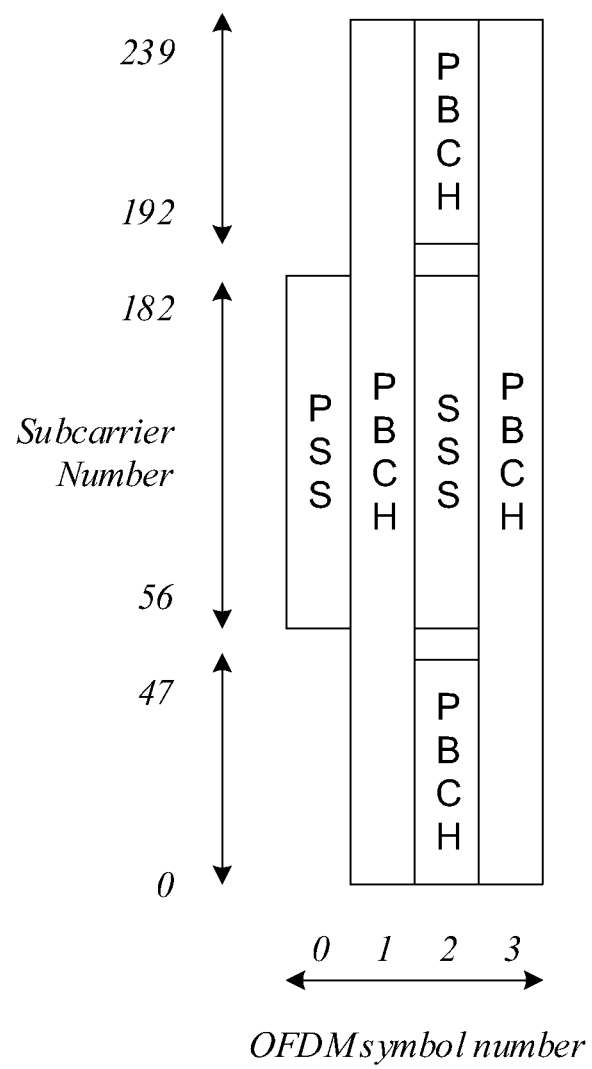
FIG. 7 shows one of possible implementations of a time-frequency structure of an SSB according to an example implementation of the present disclosure.

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB corresponds to an individual cell, which has a unique NCGI. Such an SSB is referred to as a Cell-Defining SSB (CD-SSB). A PCell is always associated to a CD-SSB located on the synchronization raster. FIG. 7 shows one of possible implementations of a time-frequency structure of an SSB according to an example implementation of the present disclosure.

Polar coding is used for PBCH.

The UE may assume a band-specific sub-carrier spacing for the SSB unless a network has configured the UE to assume a different sub-carrier spacing.

PBCH symbols carry its own frequency-multiplexed DMRS.

QPSK modulation is used for PBCH.

The PBCH physical layer model is described in TS 38.202 [20].

5.2.5 Physical layer procedures

5.2.5.1 Link adaptation

Link adaptation (AMC: adaptive modulation and coding) with various modulation schemes and channel coding rates is applied to the PDSCH. The same coding and modulation is applied to all groups of resource blocks belonging to the same L2 PDU scheduled to one user within one transmission duration and within a MIMO codeword.

For channel state estimation purposes, the UE may be configured to measure CSI-RS and estimate the downlink channel state based on the CSI-RS measurements. The UE feeds the estimated channel state back to the gNB to be used in link adaptation.

5.2.5.2 Power Control

Downlink power control can be used.

5.2.5.3 Cell search

Cell search is the procedure by which a UE acquires time and frequency synchronization with a cell and detects the Cell ID of that cell. NR cell search is based on the primary and secondary synchronization signals, and PBCH DMRS, located on the synchronization raster.

5.2.5.4 HARQ

Asynchronous Incremental Redundancy Hybrid ARQ is supported. The gNB provides the UE with the HARQ-ACK feedback timing either dynamically in the DCI or semi-statically in an RRC configuration. Retransmission of HARQ- ACK feedback is supported for operation with shared spectrum channel access by using enhanced dynamic codebook and/or one-shot triggering of HARQ-ACK transmission for all configured CCs and HARQ processes in the PUCCH group.

The UE may be configured to receive code block group based transmissions where retransmissions may be scheduled to carry a sub-set of all the code blocks of a TB.

5.2.5.5 Reception of SIB1

The Master Information Block (MIB) on PBCH provides the UE with parameters (e.g. CORESET#0 configuration) for monitoring of PDCCH for scheduling PDSCH that carries the System Information Block 1 (SIB1). PBCH may also indicate that there is no associated SIB1, in which case the UE may be pointed to another frequency from where to search for an SSB that is associated with a SIB1 as well as a frequency range where the UE may assume no SSB associated with SIB1 is present. The indicated frequency range is confined within a contiguous spectrum allocation of the same operator in which SSB is detected.

5.2.6 Downlink Reference Signals and Measurements for Positioning

The DL Positioning Reference Signals (DL PRS) are defined to facilitate support of different positioning methods such as DL-TDOA, DL-AoD, multi-RTT through the following set of UE measurements DL RSTD, DL PRS-RSRP, and UE Rx-Tx time difference respectively as described in TS 38.305 [42].

Besides DL PRS signals, UE can use SSB and CSI-RS for RRM (RSRP and RSRQ) measurements for E-CID type of positioning.

5.3 Uplink 5.3.1 Uplink transmission scheme

Two transmission schemes are supported for PUSCH: codebook based transmission and non-codebook based transmission.

For codebook based transmission, the gNB provides the UE with a transmit precoding matrix indication in the DCI. The UE uses the indication to select the PUSCH transmit precoder from the codebook. For non-codebook based transmission, the UE determines its PUSCH precoder based on wideband SRI field from the DCI.

A closed loop DMRS based spatial multiplexing is supported for PUSCH. For a given UE, up to 4 layer transmissions are supported. The number of code words is one. When transform precoding is used, only a single MIMO layer transmission is supported.

Transmission durations from 1 to 14 symbols in a slot is supported.

Aggregation of multiple slots with TB repetition is supported.

Two types of frequency hopping are supported, intra-slot frequency hopping, and in case of slot aggregation, inter-slot frequency hopping. Intra-slot and inter-slot frequency hopping are not supported when PRB interlace uplink transmission waveform is used.

PUSCH may be scheduled with DCI on PDCCH, or a semi-static configured grant may be provided over RRC, where two types of operation are supported:

- The first PUSCH is triggered with a DCI, with subsequent PUSCH transmissions following the RRC configuration and scheduling received on the DCI, or

- The PUSCH is triggered by data arrival to the UE's transmit buffer and the PUSCH transmissions follow the RRC configuration.

5.3.2    Physical-layer processing for physical uplink shared channel

The uplink physical-layer processing of transport channels consists of the following steps:

- Transport Block CRC attachment;

- Code block segmentation and Code Block CRC attachment;

- Channel coding: LDPC coding;

- Physical-layer hybrid-ARQ processing;

- Rate matching;

- Scrambling;

- Modulation: $\pi/2$ BPSK (with transform precoding only), QPSK, 16QAM, 64QAM and 256QAM;

- Layer mapping, transform precoding (enabled/disabled by configuration), and pre-coding;

- Mapping to assigned resources and antenna ports.

The UE transmits at least one symbol with demodulation reference signal on each layer on each frequency hop in which the PUSCH is transmitted, and up to 3 additional DMRS can be configured by higher layers.

Phase Tracking RS may be transmitted on additional symbols to aid receiver phase tracking.

The UL-SCH physical layer model is described in TS 38.202 [20].

For configured grants operation with shared spectrum channel access, described in section 10.3, a CG-UCI (Configured Grant Uplink Control Information) is transmitted in PUSCH scheduled by configured uplink grant.

5.3.3    Physical uplink control channel

Physical uplink control channel (PUCCH) carries the Uplink Control Information (UCI) from the UE to the gNB. Five formats of PUCCH exist, depending on the duration of PUCCH and the UCI payload size.

- Format #0: Short PUCCH of 1 or 2 symbols with small UCI payloads of up to two bits with UE multiplexing capacity of up to 6 UEs with 1-bit payload in the same PRB;

- Format #1: Long PUCCH of 4-14 symbols with small UCI payloads of up to two bits with UE multiplexing capacity of up to 84 UEs without frequency hopping and 36 UEs with frequency hopping in the same PRB;

- Format #2: Short PUCCH of 1 or 2 symbols with large UCI payloads of more than two bits with no UE multiplexing capability in the same PRBs;

- Format #3: Long PUCCH of 4-14 symbols with large UCI payloads with no UE multiplexing capability in the same PRBs;

- Format #4: Long PUCCH of 4-14 symbols with moderate UCI payloads with multiplexing capacity of up to 4 UEs in the same PRBs.

The short PUCCH format of up to two UCI bits is based on sequence selection, while the short PUCCH format of more than two UCI bits frequency multiplexes UCI and DMRS. The long PUCCH formats time-multiplex the UCI and DMRS. Frequency hopping is supported for long PUCCH formats and for short PUCCH formats of duration of 2 symbols. Long PUCCH formats can be repeated over multiple slots.

For operation with shared spectrum channel access, PUCCH Format #0, #1, #2, #3 are extended to use resource in one PRB interlace (up to two interlaces for Format #2 and Format #3) in one RB Set. PUCCH Format #2 and #3 are enhanced to support multiplexing capacity of up to 4 UEs in the same PRB interlace when one interlace is used.

UCI multiplexing in PUSCH is supported when UCI and PUSCH transmissions coincide in time, either due to transmission of a UL-SCH transport block or due to triggering of A-CSI transmission without UL-SCH transport block:

- UCI carrying HARQ-ACK feedback with 1 or 2 bits is multiplexed by puncturing PUSCH;

- In all other cases UCI is multiplexed by rate matching PUSCH.

UCI consists of the following information:

- CSI;

- ACK/NAK;

- Scheduling request.

For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

QPSK and π/2 BPSK modulation can be used for long PUCCH with more than 2 bits of information, QPSK is used for short PUCCH with more than 2 bits of information and BPSK and QPSK modulation can be used for long PUCCH with up to 2 information bits.

Transform precoding is applied to PUCCH Format #3 and Format #4.

Channel coding used for uplink control information is described in table 5.2.

Table 5.2: Channel coding for uplink control information

| Uplink Control Information size including CRC, if present | Channel code |
|---|---|
| 1 | Repetition code |

| | |
|---|---|
| 2 | Simplex code |
| 3-11 | Reed Muller code |
| >11 | Polar code |

5.3.4 Random access

Random access preamble sequences, of four different lengths are supported. Sequence length 839 is applied with subcarrier spacings of 1.25 and 5 kHz, sequence length 139 is applied with subcarrier spacings of 15, 30, 60 and 120 kHz, and sequence lengths of 571 and 1151 are applied with subcarrier spacings of 30 kHz and 15 kHz respectively. Sequence length 839 supports unrestricted sets and restricted sets of Type A and Type B, while sequence lengths 139, 571, and 1151 support unrestricted sets only. Sequence length 839 is only used for operation with licensed channel access while sequence length 139 can be used for operation with either licensed or shared spectrum channel access. Sequence lengths of 571 and 1151 can be used only for operation with shared spectrum channel access.

Multiple PRACH preamble formats are defined with one or more PRACH OFDM symbols, and different cyclic prefix and guard time. The PRACH preamble configuration to use is provided to the UE in the system information.

The UE calculates the PRACH transmit power for the retransmission of the preamble based on the most recent estimate pathloss and power ramping counter.

The system information provides information for the UE to determine the association between the SSB and the RACH resources. The RSRP threshold for SSB selection for RACH resource association is configurable by network.

5.3.5 Physical layer procedures

5.3.5.1 Link adaptation

Four types of link adaptation are supported as follows:

- Adaptive transmission bandwidth;

- Adaptive transmission duration;

- Transmission power control;

- Adaptive modulation and channel coding rate.

For channel state estimation purposes, the UE may be configured to transmit SRS that the gNB may use to estimate the uplink channel state and use the estimate in link adaptation.

5.3.5.2 Uplink Power control

The gNB determines the desired uplink transmit power and provides uplink transmit power control commands to the UE. The UE uses the provided uplink transmit power control commands to adjust its transmit power.

5.3.5.3 Uplink timing control

The gNB determines the desired Timing Advance setting and provides that to the UE. The UE uses the provided TA to determine its uplink transmit timing relative to the UE's observed downlink receive timing.

5.3.5.4 HARQ

Asynchronous Incremental Redundancy Hybrid ARQ is supported. The gNB schedules each uplink transmission and retransmission using the uplink grant on DCI. For operation with shared spectrum channel access, UE can also retransmit on configured grants.

The UE may be configured to transmit code block group based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

5.3.5.5 Prioritization of overlapping transmissions

PUSCH and PUCCH can be associated with a priority (high/low) by RRC or L1 signalling. If a PUCCH transmission overlaps in time with a transmission of a PUSCH or another PUCCH, only the PUCCH or PUSCH associated with a high priority can be transmitted.

5.3.6 Uplink Reference Signals and Measurements for Positioning

The periodic, semipersistent and aperiodic transmission of Rel-15 SRS is defined for gNB UL RTOA, UL SRS-RSRP, UL-AoA measurements to facilitate support of UL TDOA and UL AoA positioning methods as described in TS 38.305 [42].

The periodic, semipersistent and aperiodic transmission of SRS for positioning is defined for gNB UL RTOA, UL SRS-RSRP, UL-AoA, gNB Rx-Tx time difference measurements to facilitate support of UL TDOA, UL AoA and multi-RTT positioning methods as described in TS 38.305 [42].

5.4 Carrier aggregation 5.4.1 Carrier aggregation

In Carrier Aggregation (CA), two or more Component Carriers (CCs) are aggregated. A UE may simultaneously receive or transmit on one or multiple CCs depending on its capabilities:

- A UE with single timing advance capability for CA can simultaneously receive and/or transmit on multiple CCs corresponding to multiple serving cells sharing the same timing advance (multiple serving cells grouped in one TAG);

- A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell;

- A non-CA capable UE can receive on a single CC and transmit on a single CC corresponding to one serving cell only (one serving cell in one TAG).

CA is supported for both contiguous and non-contiguous CCs. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

5.4.2 Supplementary Uplink

In conjunction with a UL/DL carrier pair (FDD band) or a bidirectional carrier (TDD band), a UE may be configured with additional, Supplementary Uplink (SUL). SUL differs from the aggregated uplink in that the UE may be scheduled to transmit either on the supplementary uplink or on the uplink of the carrier being supplemented, but not on both at the same time.

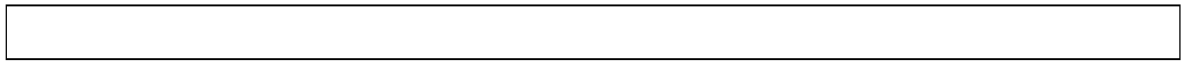

A UE may perform random access procedure via one or more of the following points shown in Table 6.

TABLE 6

Random Access procedure 5.1.1 Random Access procedure initialization
The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.
- NOTE 1: If a new Random Access procedure is triggered while another is already ongoing in the MAC entity, it is up to UE implementation whether to continue with the ongoing procedure or start with the new procedure (e.g. for SI request).
- NOTE 2: If there was an ongoing Random Access procedure that is triggered by a PDCCH order while the UE receives another PDCCH order indicating the same Random Access Preamble, PRACH mask index and uplink carrier, the Random Access procedure is considered as the same Random Access procedure as the ongoing one and not initialized again.

RRC configures the following parameters for the Random Access procedure:
- prach-ConfigurationIndex: the available set of PRACH occasions for the transmission of the Random Access Preamble for Msg1. These are also applicable to the MSGA PRACH if the PRACH occasions are shared between 2-step and 4-step RA types;
- msgA-prach-ConfigurationIndex: the available set of PRACH occasions for the transmission of the Random Access Preamble for MSGA in 2-step RA type;
- preambleReceivedTargetPower: initial Random Access Preamble power;
- rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecovetyConfig IE;
- rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecovetyConfig IE;
- msgA-RSRP-ThresholdSSB: an RSRP threshold for the selection of the SSB for 2-step RA type. If the Random Access procedure is initiated for beam failure recovery, msgA-RSRP-ThresholdSSB used for the selection of the SSB within candidateBeamRSList refers to msgA-RSRP-ThresholdSSB in BeamFailureRecovetyConfig IE;
- msgA-RSRP-ThresholdCSI-RS: an RSRP threshold for the selection of CSI-RS for 2-step RA type. If the Random Access procedure is initiated for beam failure recovery, msgA-RSRP-ThresholdCSI-RS is equal to msgA-RSRP-ThresholdSSB in BeamFailureRecovetyConfig IE;
- rsrp-ThresholdSSB-SUL: an RSRP threshold for the selection between the NUL carrier and the SUL carrier;
- msgA-RSRP-Threshold: an RSRP threshold for selection between 2-step RA type and 4-step RA type when both 2-step and 4-step RA type Random Access Resources are configured in the UL BWP for NUL;
- msgA-RSRP-ThresholdSUL: an RSRP threshold for selection between 2-step RA type and 4-step RA type when both 2-step and 4-step RA type Random Access Resources are configured in the UL BWP for SUL;
- msgA-TransMax: The maximum number of MSGA transmissions when both 4-step and 2-step RA type Random Access Resources are configured;
- candidateBeamRSList: a list of reference signals (CSI-RS and/or SSB) identifying the candidate beams for recovery and the associated Random Access parameters;
- recoverySearchSpaceId: the search space identity for monitoring the response of the beam failure recovery request;
- powerRampingStep: the power-ramping factor;
- msgA-PreamblePowerRampingStep: the power ramping factor for MSGA preamble;
- powerRampingStepHighPriority: the power-ramping factor in case of prioritized Random Access procedure;
- scalingFactorBI: a scaling factor for prioritized Random Access procedure;
- ra-PreambleIndex: Random Access Preamble;
- ra-ssb-OccasionMaskIndex: defines PRACH occasion(s) associated with an SSB in which the MAC entity may transmit a Random Access Preamble;
- msgA-SSB-SharedRO-MaskIndex: Indicates the subset of 4-step RA type PRACH occasions shared with 2-step RA type PRACH occasions for each SSB. If 2-step RA type PRACH occasions are shared with 4-step RA type PRACH occasions and msgA-SSB-SharedRO-MaskIndex is not configured, then all 4-step RA type PRACH occasions are available for 2-step RA type;
- ra-OccasionList: defines PRACH occasion(s) associated with a CSI-RS in which the MAC entity may transmit a Random Access Preamble;
- ra-PreambleStartIndex: the starting index of Random Access Preamble(s) for on-demand SI request;
- preambleTransMax: the maximum number of Random Access Preamble transmission;
- ssb-perRACH-OccasionAndCB-PreamblesPerSSB: defines the number of SSBs mapped to each PRACH occasion for 4-step RA type and the number of contention-based Random Access Preambles mapped to each SSB;
- msgA-SSB-PerRACH-OccasionAndCB-PreamblesPerSSB: defines the number of SSBs mapped to each PRACH occasion for 2-step RA type and the number of contention-based Random Access Preambles mapped to each SSB;
- if groupBconfigured is configured, then Random Access Preambles group B is configured for 4-step RA type.
  - Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

TABLE 6-continued

Random Access procedure

- if groupB-ConfiguredTwoStepRA is configured, then Random Access Preambles group B is configured for 2-step RA type.
    - Amongst the contention-based Random Access Preambles for 2-step RA type associated with an SSB (as defined in TS 38.213 [6]), the first msgA-numberOfRA-PreamblesGroupA Random Access Preambles belong to Random Access Preambles group A. The remaining Random Access Preambles associated with the SSB belong to Random Access Preambles group B (if configured).
NOTE 2: If Random Access Preambles group B is supported by the cell Random Access Preambles group B is included for each SSB.
- if Random Access Preambles group B is configured for 4-step RA type:
    - ra-Msg3SizeGroupA: the threshold to determine the groups of Random Access Preambles for 4-step RA type;
    - msg3-DeltaPreamble: $\Delta_{PREAMBLE\_Msg3}$ in TS 38.213 [6];
    - messagePowerOffsetGroupB: the power offset for preamble selection;
    - numberOfRA-PreamblesGroupA: defines the number of Random Access Preambles in Random Access Preamble group A for each SSB.
- if Random Access Preambles group B is configured for 2-step RA type:
    - msgA-DeltaPreamble: $\Delta_{PREAMBLE\_MsgA}$ in TS 38.213 [6];
    - msgA-messagePowerOffsetGroupB: the power offset for preamble selection configured as messagePowerOffsetGroupB included in GroupB-ConfiguredTwoStepRA;
    - msgA-numberOfRA-PreamblesGroupA: defines the number of Random Access Preambles in Random Access Preamble group A for each SSB configured as numberofRA-PreamblesGroupA in GroupB-ConfiguredTwoStepRA.
    - ra-MsgASizeGroupA: the threshold to determine the groups of Random Access Preambles for 2-step RA type.
- the set of Random Access Preambles and/or PRACH occasions for SI request, if any;
- the set of Random Access Preambles and/or PRACH occasions for beam failure recovery request, if any;
- the set of Random Access Preambles and/or PRACH occasions for reconfiguration with sync, if any;
- ra-ResponseWindow: the time window to monitor RA response(s) (SpCell only);
- ra-ContentionResolutionTimer: the Contention Resolution Timer (SpCell only);
- msgB-ResponseWindow: the time window to monitor RA response(s) for 2-step RA type (SpCell only).

In addition, the following information for related Serving Cell is assumed to be available for UEs:
- if Random Access Preambles group B is configured:
    - if the Serving Cell for the Random Access procedure is configured with supplementary uplink as specified in TS 38.331 [5], and SUL carrier is selected for performing Random Access Procedure:
        - $P_{CMAX,f,c}$ of the SUL carrier as specified in TS 38.101-1 [14], TS 38.101-2 [15], and TS 38.101-3 [16].
    - else:
        - $P_{CMAX,f,c}$ of the NUL carrier as specified in TS 38.101-1 [14], TS 38.101-2 [15], and TS 38.101-3 [16].

The following UE variables are used for the Random Access procedure:
- PREAMBLE_INDEX
- PREAMBLE_TRANSMISSION_COUNTER;
- PREAMBLE_POWER_RAMPING_COUNTER;
- PREAMBLE_POWER_RAMPING_STEP;
- PREAMBLE_RECEIVED_TARGET_POWER;
- PREAMBLE_BACKOFF;
- PCMAX;
- SCALING_FACTOR_BI;
- TEMPORARY_C-RNTI;
- RA_TYPE;
- POWER_OFFSET_2STEP_RA;
- MSGA_PREAMBLE_POWER_RAMPING_STEP;
- RSRP_THRESHOLD_RA_TYPE_SELECTION.

When the Random Access procedure is initiated on a Serving Cell, the MAC entity shall:
1> flush the Msg3 buffer;
1> flush the MSGA buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> set POWER_OFFSET_2STEP_RA to 0 dB;
1> if the carrier to use for the Random Access procedure is explicitly signalled:
    2> select the signalled carrier for performing Random Access procedure;
    2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in TS 38.331 [5]; and
1> if the RSRP of the downlink pathloss reference is less than rsrp-ThresholdSSB-SUL:
    2> select the SUL carrier for performing Random Access procedure;
    2> set the PCMAX to $P_{CMAX,f,c}$ of the SUL carrier;
    2> set the RSRP_THRESHOLD_RA_TYPE_SELECTION to msgA-RSRP-ThresholdSUL.
1> else:
    2> select the NUL carrier for performing Random Access procedure;
    2> set the PCMAX to $P_{CMAX,f,c}$ of the NUL carrier;
    2> set the RSRP_THRESHOLD_RA_TYPE_SELECTION to msgA-RSRP-Threshold.

TABLE 6-continued

Random Access procedure

1> perform the BWP operation;
1> if the Random Access procedure is initiated by PDCCH order and if the ra-PreambleIndex explicitly
   provided by PDCCH is not 0b000000; or
1> if the Random Access procedure was initiated for SI request (as specified in TS 38.331 [5]) and the
   Random Access Resources for SI request have been explicitly provided by RRC; or
1> if the Random Access procedure was initiated for beam failure recovery and if the contention-free
   Random Access Resources for beam failure recovery request for 4-step RA type have been explicitly
   provided by RRC for the BWP selected for Random Access procedure; or
1> if the Random Access procedure was initiated for reconfiguration with sync and if the contention-free
   Random Access Resources for 4-step RA type have been explicitly provided in rach-
   ConfigDedicated for the BWP selected for Random Access procedure:
   2> set the RA_TYPE to 4-stepRA.
1> else if the BWP selected for Random Access procedure is configured with both 2-step and 4-step RA
   type Random Access Resources and the RSRP of the downlink pathloss reference is above
   RSRP_THRESHOLD_RA_TYPE_SELECTION; or
1> if the BWP selected for Random Access procedure is only configured with 2-step RA type Random
   Access resources (i.e. no 4-step RACH RA type resources configured); or
1> if the Random Access procedure was initiated for reconfiguration with sync and if the contention-free
   Random Access Resources for 2-step RA type have been explicitly provided in rach-
   ConfigDedicated for the BWP selected for Random Access procedure:
   2> set the RA_TYPE to 2-stepRA.
1> else:
   2> set the RA_TYPE to 4-stepRA.
1> perform initialization of variables specific to Random Access type;
1> if RA_TYPE is set to 2-stepRA:
   2> perform the Random Access Resource selection procedure for 2-step RA type.
1> else:
   2> perform the Random Access Resource selection procedure.
5.1.1a Initialization of variables specific to Random Access type
The MAC entity shall:
1> if RA_TYPE is set to 2-stepRA:
   2> set PREAMBLE_POWER_RAMPING_STEP to msgA-PreamblePowerRampingStep;
   2> set SCALING_FACTOR_BI to 1;
   2> set preambleTransMax to preambleTransMax included in the RACH-ConfigGenericTwoStepRA;
   2> if the Random Access procedure was initiated for beam failure recovery; and
   2> if beamFailureRecoveryConfig is configured for the active UL BWP of the selected carrier:
      3> if ra-PrioritizationTwoStep is configured in the beamFailureRecoveryConfig:
         4> set PREAMBLE_POWER_RAMPING_STEP to the powerRampingStepHighPriority
            included in the ra-PrioritizationTwoStep in beamFailureRecoveryConfig.
         4> if scalingFactorBI is configured in the ra-PrioritizationTwoStep in
            beamFailureRecoveryConfig:
            5> set SCALING_FACTOR_BI to the scalingFactorBI.
   2> else if the Random Access procedure was initiated for handover; and
   2> if rach-ConfigDedicated is configured for the selected carrier:
      3> if ra-PrioritizationTwoStep is configured in the rach-ConfigDedicated:
         4> set PREAMBLE_POWER_RAMPING_STEP to the powerRampingStepHighPriority
            included in the ra-PrioritizationTwoStep in rach-ConfigDedicated.
         4> if scalingFactorBI is configured in ra-PrioritizationTwoStep in the rach-ConfigDedicated:
            5> set SCALING_FACTOR_BI to the scalingFactorBI.
   2> if ra-PrioritizationForAccessIdentityTwoStep is configured for the selected carrier; and
   2> if one or more Access Identities has been explicitly provided by RRC; and
   2> if for at least one of these Access Identities the corresponding bit in the ra-PriorizationForAI is
      set to one:
      3> if powerRampingStepHighPriority is configured in the ra-
         PrioritizationForAccessIdentityTwoStep:
         4> set PREAMBLE_POWER_RAMPING_STEP to the powerRampingStepHighPriority.
      3> if scalingFactorBI is configured in the ra-PrioritizationForAccessIdentityTwoStep:
         4> set SCALING_FACTOR_BI to the scalingFactorBI.
   2> set MSGA_PREAMBLE_POWER_RAMPING_STEP to PREAMBLE_POWER_RAMPING_STEP.
1> else (i.e. RA_TYPE is set to 4-stepRA):
   2> set PREAMBLE_POWER_RAMPING_STEP to powerRampingStep;
   2> set SCALING_FACTOR_BI to 1;
   2> set preambleTransMax to preambleTransMax included in the RACH-ConfigGeneric;
   2> if the Random Access procedure was initiated for SpCell beam failure recovery; and
   2> if beamFailureRecoveryConfig is configured for the active UL BWP of the selected carrier:
      3> start the beamFailureRecoveryTimer, if configured;
      3> apply the parameters powerRampingStep, preambleReceivedTargetPower, and
         preambleTransMax configured in the beamFailureRecoveryConfig;
      3> if powerRampingStepHighPriority is configured in the beamFailureRecoveryConfig:
         4> set PREAMBLE_POWER_RAMPING_STEP to the powerRampingStepHighPriority.
      3> else:
         4> set PREAMBLE_POWER_RAMPING_STEP to powerRampingStep.
      3> if scalingFactorBI is configured in the beamFailureRecoveryConfig:
         4> set SCALING_FACTOR_BI to the scalingFactorBI.
   2> else if the Random Access procedure was initiated for handover; and
   2> if rach-ConfigDedicated is configured for the selected carrier:
      3> if powerRampingStepHighPriority is configured in the rach-ConfigDedicated:
         4> set PREAMBLE_POWER_RAMPING_STEP to the powerRampingStepHighPriority.

TABLE 6-continued

Random Access procedure

3> if scalingFactorBI is configured in the rach-ConfigDedicated:
    4> set SCALING_FACTOR_BI to the scalingFactorBI.
  2> if ra-PrioritizationForAccessIdentily is configured for the selected carrier; and
  2> if one or more Access Identities has been explicitly provided by RRC; and
  2> if for at least one of these Access Identities the corresponding bit in the ra-PriorizationForAI is
   set to one:
   3> if powerRampingStepHighPriority is configured in the ra-PrioritizationForAccessIdentity:
    4> set PREAMBLE_POWER_RAMPING_STEP to the powerRampingStepHighPriority.
   3> if scalingFactorBI is configured in the ra-PrioritizationForAccessIdentity:
    4> set SCALING_FACTOR_BI to the scalingFactorBI.
  2> if RA_TYPE is switched from 2-stepRA to 4-step RA during this Random Access procedure:
   3> set POWER_OFFSET_2STEP_RA to (PREAMBLE_POWER_RAMPING_COUNTER − 1) ×
    (MSGA_PREAMBLE_POWER_RAMPING_STEP − PREAMBLE_POWER_RAMPING).
5.1.2 Random Access Resource selection
If the selected RA_TYPE is set to 4-stepRA, the MAC entity shall:
 1> if the Random Access procedure was initiated for SpCell beam failure recovery; and
 1> if the beamFailureRecoveryTimer is either running or not configured; and
 1> if the contention-free Random Access Resources for beam failure recovery request associated with
  any of the SSBs and/or CSI-RSs have been explicitly provided by RRC; and
 1> if at least one of the SSBs with SS-RSRP above rsrp-ThresholdSSB amongst the SSBs in
  candidateBeamRSList or the CSI-RSs with CSI-RSRP above rsrp-ThresholdCSI-RS amongst the
  CSI-RSs in candidateBeamRSList is available:
  2> select an SSB with SS-RSRP above rsrp-ThresholdSSB amongst the SSBs in
   candidateBeamRSList or a CSI-RS with CSI-RSRP above rsrp-ThresholdCSI-RS amongst the
   CSI-RSs in candidateBeamRSList;
  2> if CSI-RS is selected, and there is no ra-PreambleIndex associated with the selected CSI-RS:
   3> set the PREAMBLE_INDEX to a ra-PreambleIndex corresponding to the SSB in
    candidateBeamRSList which is quasi-colocated with the selected CSI-RS as specified in TS
    38.214 [7].
  2> else:
   3> set the PREAMBLE_INDEX to a ra-PreambleIndex corresponding to the selected SSB or CSI-
    RS from the set of Random Access Preambles for beam failure recovery request.
 1> else if the ra-PreambleIndex has been explicitly provided by PDCCH; and
 1> if the ra-PreambleIndex is not 0b000000:
  2> set the PREAMBLE_INDEX to the signalled ra-PreambleIndex;
  2> select the SSB signalled by PDCCH.
 1> else if the contention-free Random Access Resources associated with SSBs have been explicitly
  provided in rach-ConfigDedicated and at least one SSB with SS-RSRP above rsrp-ThresholdSSB
  amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
 1> else if the contention-free Random Access Resources associated with CSI-RSs have been explicitly
  provided in rach-ConfigDedicated and at least one CSI-RS with CSI-RSRP above rsrp-
  ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
 1> else if the Random Access procedure was initiated for SI request (as specified in TS 38.331 [5]); and
 1> if the Random Access Resources for SI request have been explicitly provided by RRC:
  2> if at least one of the SSBs with SS-RSRP above rsrp-ThresholdSSB is available:
   3> select an SSB with SS-RSRP above rsrp-ThresholdSSB.
  2> else:
   3> select any SSB.
  2> select a Random Access Preamble corresponding to the selected SSB, from the Random Access
   Preamble(s) determined according to ra-PreambleStartIndex as specified in TS 38.331 [5];
  2> set the PREAMBLE_INDEX to selected Random Access Preamble.
 1> else (i.e. for the contention-based Random Access preamble selection):
  2> if at least one of the SSBs with SS-RSRP above rsrp-ThresholdSSB is available:
   3> select an SSB with SS-RSRP above rsrp-ThresholdSSB.
  2> else:
   3> select any SSB.
  2> if the RA_TYPE is switched from 2-stepRA to 4-stepRA:
   3> if a Random Access Preambles group was selected during the current Random Access
    procedure:
    4> select the same group of Random Access Preambles as was selected for the 2-step RA type.
   3> else:
    4> if Random Access Preambles group B is configured; and
    4> if the transport block size of the MSGA payload configured in the rach-ConfigDedicated
     corresponds to the transport block size of the MSGA payload associated with Random
     Access Preambles group B:
     5> select the Random Access Preambles group B.
    4> else:
     5> select the Random Access Preambles group A.
  2> else if Msg3 buffer is empty:
   3> if Random Access Preambles group B is configured:
    4> if the potential Msg3 size (UL data available for transmission plus MAC header and, where
     required, MAC CEs) is greater than ra-Msg3SizeGroupA and the pathloss is less than
     PCMAX (of the Serving Cell performing the Random Access Procedure) −
     preambleReceivedTargetPower − msg3-DeltaPreamble − messagePowerOffsetGroupB; or TABLE 6-continued Random Access procedure 4> if the Random Access procedure was initiated for the CCCH logical channel and the CCCH SDU size plus MAC subheader is greater than ra-Msg3SizeGroupA:
       5> select the Random Access Preambles group B.
    4> else:
       5> select the Random Access Preambles group A.
   3> else:
      4> select the Random Access Preambles group A.
  2> else (i.e. Msg3 is being retransmitted):
     3> select the same group of Random Access Preambles as was used for the Random Access Preamble transmission attempt corresponding to the first transmission of Msg3.
  2> select a Random Access Preamble randomly with equal probability from the Random Access Preambles associated with the selected SSB and the selected Random Access Preambles group.
  2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
  2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to TS 38.213 [6] corresponding to the selected SSB).
1> else if an SSB is selected above:
  2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to TS 38.213 [6], corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
     3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
     3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure.
NOTE 1: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.
NOTE 2: For a UE operating in a semi-static channel access mode as described in TS 37.213 [18], Random Access Resources overlapping with the idle time of a fixed frame period are not considered for selection.
5.1.2a Random Access Resource selection for 2-step RA type
If the selected RA_TYPE is set to 2-stepRA, the MAC entity shall:
  1> if the contention-free 2-step RA type Resources associated with SSBs have been explicitly provided in rach-ConfigDedicated and at least one SSB with SS-RSRP above msgA-RSRP-ThresholdSSB amongst the associated SSBs is available:
    2> select an SSB with SS-RSRP above msgA-RSRP-ThresholdSSB amongst the associated SSBs;
    2> set the PREAMBLE_INDEX to a ra-PreambleIndex corresponding to the selected SSB.
  1> else if the contention-free 2-step RA type Resources associated with CSI-RSs have been explicitly provided in rach-ConfigDedicated and at least one CSI-RS with CSI-RSRP above msgA-RSRP-ThresholdCSI-RS amongst the associated CSI-RSs is available:
    2> select a CSI-RS with CSI-RSRP above msgA-RSRP-ThresholdCSI-RS amongst the associated CSI-RSs;
    2> set the PREAMBLE_INDEX to a ra-PreambleIndex corresponding to the selected CSI-RS.
  1> else (i.e. for the contention-based Random Access Preamble selection):
    2> if at least one of the SSBs with SS-RSRP above msgA-RSRP-ThresholdSSB is available:
      3> select an SSB with SS-RSRP above msgA-RSRP-ThresholdSSB.
    2> else:
      3> select any SSB.
    2> if contention-free Random Access Resources for 2-step RA type have not been configured and if Random Access Preambles group has not yet been selected during the current Random Access procedure:
      3> if Random Access Preambles group B for 2-step RA type is configured:
        4> if the potential MSGA payload size (UL data available for transmission plus MAC header and, where required, MAC CEs) is greater than the ra-MsgASizeGroupA and the pathloss is TABLE 6-continued Random Access procedure less than PCMAX (of the Serving Cell performing the Random Access Procedure) – msgA-
      PreambleReceivedTargetPower – msgA-DeltaPreamble – msgA-
      messagePowerOffsetGroupB; or
    4> if the Random Access procedure was initiated for the CCCH logical channel and the CCCH
      SDU size plus MAC subheader is greater than ra-MsgASizeGroupA:
      5> select the Random Access Preambles group B.
    4> else:
      5> select the Random Access Preambles group A.
  3> else:
    4> select the Random Access Preambles group A.
2> else if contention-free Random Access Resources for 2-step RA type have been configured and if
  Random Access Preambles group has not yet been selected during the current Random Access
  procedure:
  3> if Random Access Preambles group B for 2-step RA type is configured; and
  3> if the transport block size of the MSGA payload configured in the rach-ConfigDedicated
    corresponds to the transport block size of the MSGA payload associated with Random Access
    Preambles group B:
    4> select the Random Access Preambles group B.
  3> else:
    4> select the Random Access Preambles group A.
2> else (i.e. Random Access preambles group has been selected during the current Random Access
  procedure):
  3> select the same group of Random Access Preambles as was used for the Random Access
    Preamble transmission attempt corresponding to the earlier transmission of MSGA.
2> select a Random Access Preamble randomly with equal probability from the 2-step RA type
  Random Access Preambles associated with the selected SSB and the selected Random Access
  Preambles group;
2> set the PREAMBLE_INDEX to the selected Random Access Preamble;
1> determine the next available PRACH occasion from the PRACH occasions corresponding to the
  selected SSB permitted by the restrictions given by the msgA-SSB-SharedRO-MaskIndex if
  configured and ra-ssb-OccasionMaskIndex if configured (the MAC entity shall select a PRACH
  occasion randomly with equal probability among the consecutive PRACH occasions allocated for 2-
  step RA type according to TS 38.213 [6], corresponding to the selected SSB; the MAC entity may
  take into account the possible occurrence of measurement gaps when determining the next available
  PRACH occasion corresponding to the selected SSB);
1> determine the UL grant and the associated HARQ information for the PUSCH resource of MSGA
  associated with the selected preamble and PRACH occasion according to TS 38.213 [6];
1> deliver the UL grant and the associated HARQ information to the HARQ entity;
1> perform the MSGA transmission procedure.
NOTE: To determine if there is an SSB with SS-RSRP above msgA-RSRP-ThresholdSSB, the UE uses
     the latest unfiltered L1-RSRP measurement.

5.1.3 Random Access Preamble transmission
The MAC entity shall, for each Random Access Preamble:
  1> if PREAMBLE_TRANSMISSION_COUNTER is greater than one; and
  1> if the notification of suspending power ramping counter has not been received from lower layers; and
  1> if LBT failure indication was not received from lower layers for the last Random Access Preamble
    transmission; and
  1> if SSB or CSI-RS selected is not changed from the selection in the last Random Access Preamble
    transmission:
    2> increment PREAMBLE_POWER_RAMPING_COUNTER by 1.
  1> select the value of DELTA_PREAMBLE;
  1> set PREAMBLE_RECEIVED_TARGET_POWER to preambleReceivedTargetPower +
    DELTA_PREAMBLE + (PREAMBLE_POWER_RAMPING_COUNTER – 1) ×
    PREAMBLE_POWER_RAMPING_STEP + POWER_OFFSET_2STEP_RA;
  1> except for contention-free Random Access Preamble for beam failure recovery request, compute the
    RA-RNTI associated with the PRACH occasion in which the Random Access Preamble is
    transmitted;
  1> instruct the physical layer to transmit the Random Access Preamble using the selected PRACH
    occasion, corresponding RA-RNTI (if available), PREAMBLE_INDEX and
    PREAMBLE_RECEIVED_TARGET_POWER.
  1> if LBT failure indication is received from lower layers for this Random Access Preamble
    transmission:
    2> perform the Random Access Resource selection procedure.
The RA-RNTI associated with the PRACH occasion in which the Random Access Preamble is transmitted,
is computed as:
  RA-RNTI = 1 + s_id + 14 × t_id + 14 × 80 × f_id + 14 × 80 × 8 × ul_carrier_id
where s_id is the index of the first OFDM symbol of the PRACH occasion ($0 \leq s\_id < 14$), t_id is the index
of the first slot of the PRACH occasion in a system frame ($0 \leq t\_id < 80$), where the subcarrier spacing to
determine t_id is based on the value of μ specified in TS 38.211 [8], f_id is the index of the PRACH
occasion in the frequency domain ($0 \leq f\_id < 8$), and ul_carrier_id is the UL carrier used for Random
Access Preamble transmission (0 for NUL carrier, and 1 for SUL carrier).

5.1.3a MSGA transmission
The MAC entity shall, for each MSGA:
  1> if PREAMBLE_TRANSMISSION_COUNTER is greater than one; and
  1> if the notification of suspending power ramping counter has not been received from lower layers; and
  1> if LBT failure indication was not received from lower layers for the last MSGA Random Access
    Preamble transmission; and TABLE 6-continued Random Access procedure 1> if SSB or CSI-RS selected is not changed from the selection in the last Random Access Preamble transmission:
   2> increment PREAMBLE_POWER_RAMPING_COUNTER by 1.
1> select the value of DELTA_PREAMBLE;
1> set PREAMBLE_RECEIVED_TARGET_POWER to preambleReceivedTargetPower + DELTA_PREAMBLE + (PREAMBLE_POWER_RAMPING_COUNTER − 1) × PREAMBLE_POWER_RAMPING_STEP;
1> if this is the first MSGA transmission within this Random Access procedure:
   2> if the transmission is not being made for the CCCH logical channel:
      3> indicate to the Multiplexing and assembly entity to include a C-RNTI MAC CE in the subsequent uplink transmission.
   2> if the Random Access procedure was initiated for SpCell beam failure recovery:
      3> indicate to the Multiplexing and assembly entity to include a BFR MAC CE or a Truncated BFR MAC CE in the subsequent uplink transmission.
   2> obtain the MAC PDU to transmit from the Multiplexing and assembly entity and store it in the MSGA buffer.
1> compute the MSGB-RNTI associated with the PRACH occasion in which the Random Access Preamble is transmitted;
1> instruct the physical layer to transmit the MSGA using the selected PRACH occasion and the associated PUSCH resource, using the corresponding RA-RNTI, MSGB-RNTI, PREAMBLE_INDEX, PREAMBLE_RECEIVED_TARGET_POWER, preambleReceivedTargetPower, and the amount of power ramping applied to the latest MSGA preamble transmission (i.e. (PREAMBLE_POWER_RAMPING_COUNTER − 1) × PREAMBLE_POWER_RAMPING_STEP);
1> if LBT failure indication is received from lower layers for the transmission of this MSGA Random Access Preamble:
   2> instruct the physical layer to cancel the transmission of the MSGA payload on the associated PUSCH resource;
   2> perform the Random Access Resource selection procedure for 2-step RA type.
NOTE: The MSGA transmission includes the transmission of the PRACH Preamble as well as the contents of the MSGA buffer in the PUSCH resource corresponding to the selected PRACH occasion and PREAMBLE_INDEX (see TS 38.213 [6])

The MSGB-RNTI associated with the PRACH occasion in which the Random Access Preamble is transmitted, is computed as:

$$\text{MSGB-RNTI} = 1 + s\_id + 14 \times t\_id + 14 \times 80 \times f\_id + 14 \times 80 \times 8 \times ul\_carrier\_id + 14 \times 80 \times 8 \times 2$$

where s_id is the index of the first OFDM symbol of the PRACH occasion ($0 \leq s\_id < 14$), t_id is the index of the first slot of the PRACH occasion in a system frame ($0 \leq t\_id < 80$), where the subcarrier spacing to determine t_id is based on the value of $\mu$ specified in TS 38.211 [8], f_id is the index of the PRACH occasion in the frequency domain ($0 \leq f\_id < 8$), and ul_carrier_id is the UL carrier used for Random Access Preamble transmission (0 for NUL carrier, and 1 for SUL carrier). The RA-RNTI is calculated.

5.1.4 Random Access Response reception

Once the Random Access Preamble is transmitted and regardless of the possible occurrence of a measurement gap, the MAC entity shall:
1> if the contention-free Random Access Preamble for beam failure recovery request was transmitted by the MAC entity:
   2> start the ra-ResponseWindow configured in BeamFailureRecoveryConfig at the first PDCCH occasion as specified in TS 38.213 [6] from the end of the Random Access Preamble transmission;
   2> monitor for a PDCCH transmission on the search space indicated by recoverySearchSpaceId of the SpCell identified by the C-RNTI while ra-ResponseWindow is running.
1> else:
   2> start the ra-ResponseWindow configured in RACH-ConfigCommon at the first PDCCH occasion as specified in TS 38.213 [6] from the end of the Random Access Preamble transmission;
   2> monitor the PDCCH of the SpCell for Random Access Response(s) identified by the RA-RNTI while the ra-ResponseWindow is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
   2> consider the Random Access procedure successfully completed.
1> else if a valid (as specified in TS 38.213 [6]) downlink assignment has been received on the PDCCH for the RA-RNTI and the received TB is successfully decoded:
   2> if the Random Access Response contains a MAC subPDU with Backoff Indicator:
      3> set the PREAMBLE_BACKOFF to value of the BI field of the MAC subPDU, multiplied with SCALING_FACTOR_BI.
   2> else:
      3> set the PREAMBLE_BACKOFF to 0 ms.
   2> if the Random Access Response contains a MAC subPDU with Random Access Preamble identifier corresponding to the transmitted PREAMBLE_INDEX:
      3> consider this Random Access Response reception successful.
   2> if the Random Access Response reception is considered successful:
      3> if the Random Access Response includes a MAC subPDU with RAPID only:
         4> consider this Random Access procedure successfully completed;
         4> indicate the reception of an acknowledgement for SI request to upper layers.
      3> else:
         4> apply the following actions for the Serving Cell where the Random Access Preamble was transmitted:

TABLE 6-continued

Random Access procedure

5> process the received Timing Advance Command;
   5> indicate the preambleReceivedTargetPower and the amount of power ramping applied to
    the latest Random Access Preamble transmission to lower layers (i.e.
    (PREAMBLE_POWER_RAMPING_COUNTER – 1) ×
    PREAMBLE_POWER_RAMPING_STEP);
   5> if the Random Access procedure for an SCell is performed on uplink carrier where
    pusch-Config is not configured:
     6> ignore the received UL grant.
   5> else:
     6> process the received UL grant value and indicate it to the lower layers.
  4> if the Random Access Preamble was not selected by the MAC entity among the contention-
   based Random Access Preamble(s):
    5> consider the Random Access procedure successfully completed.
  4> else:
   5> set the TEMPORARY_C-RNTI to the value received in the Random Access Response;
   5> if this is the first successfully received Random Access Response within this Random
    Access procedure:
     6> if the transmission is not being made for the CCCH logical channel:
      7> indicate to the Multiplexing and assembly entity to include a C-RNTI MAC CE in
       the subsequent uplink transmission.
     6> if the Random Access procedure was initiated for SpCell beam failure recovery:
      7> indicate to the Multiplexing and assembly entity to include a BFR MAC CE or a
       Truncated BFR MAC CE in the subsequent uplink transmission.
     6> obtain the MAC PDU to transmit from the Multiplexing and assembly entity and
      store it in the Msg3 buffer.
NOTE: If within a Random Access procedure, an uplink grant provided in the Random Access
  Response for the same group of contention-based Random Access Preambles has a different
  size than the first uplink grant allocated during that Random Access procedure, the UE
  behavior is not defined.
1> if ra-ResponseWindow configured in BeamFailureRecovoyConfig expires and if a PDCCH
  transmission on the search space indicated by recovelySearchSpaceId addressed to the C-RNTI has
  not been received on the Serving Cell where the preamble was transmitted; or
1> if ra-ResponseWindow configured in RACH-ConfigCommon expires, and if the Random Access
  Response containing Random Access Preamble identifiers that matches the transmitted
  PREAMBLE_INDEX has not been received:
2> consider the Random Access Response reception not successful;
2> increment PREAMBLE_TRANSMISSION_COUNTER by 1;
2> if PREAMBLE_TRANSMISSION_COUNTER = preambleTransMax + 1:
  3> if the Random Access Preamble is transmitted on the SpCell:
   4> indicate a Random Access problem to upper layers;
   4> if this Random Access procedure was triggered for SI request:
    5> consider the Random Access procedure unsuccessfully completed.
  3> else if the Random Access Preamble is transmitted on an SCell:
   4> consider the Random Access procedure unsuccessfully completed.
2> if the Random Access procedure is not completed:
  3> select a random backoff time according to a uniform distribution between 0 and the
   PREAMBLE_BACKOFF;
  3> if the criteria to select contention-free Random Access Resources is met during the backoff
   time:
   4> perform the Random Access Resource selection procedure;
  3> else if the Random Access procedure for an SCell is performed on uplink carrier where pusch-
   Config is not configured:
   4> delay the subsequent Random Access transmission until the Random Access Procedure is
    triggered by a PDCCH order with the same ra-PreambleIndex, ra-ssb-OccasionMaskIndex
    and UL/SUL indicator TS 38.212 [9].
  3> else:
   4> perform the Random Access Resource selection procedure after the backoff time.
The MAC entity may stop ra-ResponseWindow (and hence monitoring for Random Access Response(s))
after successful reception of a Random Access Response containing Random Access Preamble identifiers
that matches the transmitted PREAMBLE_INDEX.
HARQ operation is not applicable to the Random Access Response reception.
5.1.4a MSGB reception and contention resolution for 2-step RA type
Once the MSGA preamble is transmitted, regardless of the possible occurrence of a measurement gap, the
MAC entity shall:
 1> start the msgB-ResponseWindow at the first PDCCH occasion from the end of the MSGA
  transmission as specified in TS 38.213 [6];
 1> monitor the PDCCH of the SpCell for a Random Access Response identified by MSGB-RNTI while
  the msgB-ResponseWindow is running;
 1> if C-RNTI MAC CE was included in the MSGA:
  2> monitor the PDCCH of the SpCell for Random Access Response identified by the C-RNTI while
   the msgB-ResponseWindow is running;
 1> if notification of a reception of a PDCCH transmission of the SpCell is received from lower layers:
  2> if the C-RNTI MAC CE was included in MSGA:
   3> if the Random Access procedure was initiated for beam failure recovery and the PDCCH
    transmission is addressed to the C-RNTI:
    4> consider this Random Access Response reception successful;
    4> stop the msgB-ResponseWindow;
    4> consider this Random Access procedure successfully completed.

TABLE 6-continued

Random Access procedure

3> else if the timeAlignmentTimer associated with the PTAG is running:
        4> if the PDCCH transmission is addressed to the C-RNTI and contains a UL grant for a new
           transmission:
           5> consider this Random Access Response reception successful;
           5> stop the msgB-ResponseWindow;
           5> consider this Random Access procedure successfully completed.
    3> else:
        4> if a downlink assignment has been received on the PDCCH for the C-RNTI and the
           received TB is successfully decoded:
           5> if the MAC PDU contains the Absolute Timing Advance Command MAC CE subPDU:
               6> process the received Timing Advance Command;
               6> consider this Random Access Response reception successful;
               6> stop the msgB-ResponseWindow;
               6> consider this Random Access procedure successfully completed and finish the
                   disassembly and demultiplexing of the MAC PDU.
2> if a downlink assignment has been received on the PDCCH for the MSGB-RNTI and it includes
    the two LSB bits of the SFN corresponding to the PRACH occasion used to transmit the Random
    Access Preamble of MSGA and the received TB is successfully decoded:
    3> if the MSGB contains a MAC subPDU with Backoff Indicator:
        4> set the PREAMBLE_BACKOFF to value of the BI field of the MAC subPDU, multiplied
           with SCALING_FACTOR_BI.
    3> else:
        4> set the PREAMBLE_BACKOFF to 0 ms.
    3> if the MSGB contains a fallbackRAR MAC subPDU; and
    3> if the Random Access Preamble identifier in the MAC subPDU matches the transmitted
        PREAMBLE_INDEX:
        4> consider this Random Access Response reception successful;
        4> apply the following actions for the SpCell:
           5> process the received Timing Advance Command;
           5> indicate the preambleReceivedTargetPower and the amount of power ramping applied to
               the latest Random Access Preamble transmission to lower layers (i.e.
               (PREAMBLE_POWER_RAMPING_COUNTER − 1) ×
               PREAMBLE_POWER_RAMPING_STEP);
           5> if the Random Access Preamble was not selected by the MAC entity among the
               contention-based Random Access Preamble(s):
               6> consider the Random Access procedure successfully completed.
           5> else:
               6> set the TEMPORARY_C-RNTI to the value received in the Random Access
                   Response;
           5> if the Msg3 buffer is empty:
               6> obtain the MAC PDU to transmit from the MSGA buffer and store it in the Msg3
                   buffer;
           5> process the received UL grant value and indicate it to the lower layers and proceed with
               Msg3 transmission;
NOTE: If within a 2-step RA type procedure, an uplink grant provided in the fallback RAR has a
    different size than the MSGA payload, the UE behavior is not defined.
    3> else if the MSGB contains a successRAR MAC subPDU; and
    3> if the CCCH SDU was included in the MSGA and the UE Contention Resolution Identity in
        the MAC subPDU matches the CCCH SDU:
        4> stop msgB-ResponseWindow;
        4> if this Random Access procedure was initiated for SI request:
           5> indicate the reception of an acknowledgement for SI request to upper layers.
        4> else:
           5> set the C-RNTI to the value received in the successRAR;
           5> apply the following actions for the SpCell:
               6> process the received Timing Advance Command;
               6> indicate the preambleReceivedTargetPower and the amount of power ramping
                   applied to the latest Random Access Preamble transmission to lower layers (i.e.
                   (PREAMBLE_POWER_RAMPING_COUNTER − 1) ×
                   PREAMBLE_POWER_RAMPING_STEP);
        4> deliver the TPC, PUCCH resource Indicator and HARQ feedback Timing Indicator
           received in successRAR to lower layers.
        4> consider this Random Access Response reception successful;
        4> consider this Random Access procedure successfully completed;
        4> finish the disassembly and demultiplexing of the MAC PDU.
1> if msgB -ResponseWindow expires, and the Random Access Response Reception has not been
  considered as successful based on descriptions above:
  2> increment PREAMBLE_TRANSMISSION_COUNTER by 1;
  2> if PREAMBLE_TRANSMISSION_COUNTER = preambleTransMax + 1:
    3> indicate a Random Access problem to upper layers;
    3> if this Random Access procedure was triggered for SI request:
        4> consider this Random Access procedure unsuccessfully completed.
  2> if the Random Access procedure is not completed:
    3> if msgA-TransMax is configured and PREAMBLE_TRANSMISSION_COUNTER = msgA-
        TransMax + 1:
        4> set the RA_TYPE to 4-stepRA;
        4> perform initialization of variables specific to Random Access type;

TABLE 6-continued

Random Access procedure

4> if the Msg3 buffer is empty:
        5> obtain the MAC PDU to transmit from the MSGA buffer and store it in the Msg3 buffer;
    4> flush HARQ buffer used for the transmission of MAC PDU in the MSGA buffer;
    4> discard explicitly signalled contention-free 2-step RA type Random Access Resources, if
       any;
    4> perform the Random Access Resource selection procedure.
  3> else:
    4> select a random backoff time according to a uniform distribution between 0 and the
       PREAMBLE_BACKOFF;
    4> if the criteria to select contention-free Random Access Resources is met during the backoff
       time:
       5> perform the Random Access Resource selection procedure for 2-step RA type Random
          Access;
    4> else:
       5> perform the Random Access Resource selection procedure for 2-step RA type Random
          Access after the backoff time.
Upon receiving a fallbackRAR, the MAC entity may stop msgB-ResponseWindow once the Random Access
Response reception is considered as successful.
5.1.5 Contention Resolution
Once Msg3 is transmitted, regardless of LBT failure indication from lower layers for Msg3, the MAC entity
shall:
  1> start the ra-ContentionResolutionTimer and restart the ra-ContentionResolutionTimer at each HARQ
    retransmission in the first symbol after the end of the Msg3 transmission;
  1> monitor the PDCCH while the ra-ContentionResolutionTimer is running regardless of the possible
    occurrence of a measurement gap;
  1> if notification of a reception of a PDCCH transmission of the SpCell is received from lower layers:
    2> if the C-RNTI MAC CE was included in Msg3:
      3> if the Random Access procedure was initiated for SpCell beam failure recovery and the
         PDCCH transmission is addressed to the C-RNTI; or
      3> if the Random Access procedure was initiated by a PDCCH order and the PDCCH
         transmission is addressed to the C-RNTI; or
      3> if the Random Access procedure was initiated by the MAC sublayer itself or by the RRC
         sublayer and the PDCCH transmission is addressed to the C-RNTI and contains a UL grant for
         a new transmission:
        4> consider this Contention Resolution successful;
        4> stop ra-ContentionResolutionTimer;
        4> discard the TEMPORARY_C-RNTI;
        4> consider this Random Access procedure successfully completed.
    2> else if the CCCH SDU was included in Msg3 and the PDCCH transmission is addressed to its
       TEMPORARY_C-RNTI:
      3> if the MAC PDU is successfully decoded:
        4> stop ra-ContentionResolutionTimer;
        4> if the MAC PDU contains a UE Contention Resolution Identity MAC CE; and
        4> if the UE Contention Resolution Identity in the MAC CE matches the CCCH SDU
          transmitted in Msg3:
          5> consider this Contention Resolution successful and finish the disassembly and
            demultiplexing of the MAC PDU;
          5> if this Random Access procedure was initiated for SI request:
            6> indicate the reception of an acknowledgement for SI request to upper layers.
          5> else:
            6> set the C-RNTI to the value of the TEMPORARY_C-RNTI;
          5> discard the TEMPORARY_C-RNTI;
          5> consider this Random Access procedure successfully completed.
        4> else:
          5> discard the TEMPORARY_C-RNTI;
          5> consider this Contention Resolution not successful and discard the successfully decoded
            MAC PDU.
  1> if ra-ContentionResolutionTimer expires:
    2> discard the TEMPORARY_C-RNTI;
    2> consider the Contention Resolution not successful.
  1> if the Contention Resolution is considered not successful:
    2> flush the HARQ buffer used for transmission of the MAC PDU in the Msg3 buffer;
    2> increment PREAMBLE_TRANSMISSION_COUNTER by 1;
    2> if PREAMBLE_TRANSMISSION_COUNTER = preambleTransMax + 1:
      3> indicate a Random Access problem to upper layers.
      3> if this Random Access procedure was triggered for SI request:
        4> consider the Random Access procedure unsuccessfully completed.
    2> if the Random Access procedure is not completed:
      3> if the RA_TYPE is set to 4-stepRA:
        4> select a random backoff time according to a uniform distribution between 0 and the
          PREAMBLE_BACKOFF;
        4> if the criteria to select contention-free Random Access Resources is met during the backoff
          time:
          5> perform the Random Access Resource selection procedure;
        4> else:
          5> perform the Random Access Resource selection procedure after the backoff time.

TABLE 6-continued

| Random Access procedure |
|---|
|     3> else (i.e. the RA_TYPE is set to 2-stepRA):<br>        4> if msgA-TransMax is configured and PREAMBLE_TRANSMISSION_COUNTER = msgA-TransMax + 1:<br>           5> set the RA_TYPE to 4-stepRA;<br>           5> perform initialization of variables specific to Random Access type;<br>           5> flush HARQ buffer used for the transmission of MAC PDU in the MSGA buffer;<br>           5> discard explicitly signalled contention-free 2-step RA type Random Access Resources, if any;<br>           5> perform the Random Access Resource selection<br>        4> else:<br>           5> select a random backoff time according to a uniform distribution between 0 and the PREAMBLE_BACKOFF;<br>           5> if the criteria to select contention-free Random Access Resources is met during the backoff time:<br>                6> perform the Random Access Resource selection procedure for 2-step RA type.<br>           5> else:<br>                6> perform the Random Access Resource selection for 2-step RA type procedure after the backoff time.<br>5.1.6 Completion of the Random Access procedure<br>Upon completion of the Random Access procedure, the MAC entity shall:<br>    1> discard any explicitly signalled contention-free Random Access Resources for 2-step RA type and 4-step RA type except the 4-step RA type contention-free Random Access Resources for beam failure recovery request, if any;<br>    1> flush the HARQ buffer used for transmission of the MAC PDU in the Msg3 buffer and the MSGA buffer;<br>    1> if the Random Access procedure towards target cell for DAPS handover is successfully completed:<br>        2> indicate the successful completion of the Random Access procedure to the upper layers. |

A UE may perform Beam Failure Detection and/or Beam Failure Recovery procedure via one or more of the following points shown in Table 7.

A UE may perform Beam Failure Detection and/or Beam Failure Recovery procedure via one or more of the following points shown in Table 7.

Table 7

| Beam Failure Detection and Recovery procedure |
|---|
| The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If *beamFailureRecoveryConfig* is reconfigured by upper layers during an ongoing Random Access procedure for beam failure recovery for SpCell, the MAC entity shall stop the ongoing Random Access procedure and initiate a Random Access procedure using the new configuration. |
| RRC configures the following parameters in the *BeamFailureRecoveryConfig* and the *RadioLinkMonitoringConfig* for the Beam Failure Detection and Recovery procedure: <br><br> - *beamFailureInstanceMaxCount* for the beam failure detection; <br><br> - *beamFailureDetectionTimer* for the beam failure detection; <br><br> - *beamFailureRecoveryTimer* for the beam failure recovery procedure; <br><br> - *rsrp-ThresholdSSB*: an RSRP threshold for the beam failure recovery; <br><br> - *powerRampingStep*: *powerRampingStep* for the SpCell beam failure recovery; <br><br> - *powerRampingStepHighPriority*: *powerRampingStepHighPriority* for the SpCell beam failure recovery; <br><br> - *preambleReceivedTargetPower*: *preambleReceivedTargetPower* for the SpCell beam failure recovery; <br><br> - *preambleTransMax*: *preambleTransMax* for the SpCell beam failure recovery; <br><br> - *scalingFactorBI*: *scalingFactorBI* for the SpCell beam failure recovery; <br><br> - *ssb-perRACH-Occasion*: *ssb-perRACH-Occasion* for the SpCell beam failure recovery; <br><br> - *ra-ResponseWindow*: the time window to monitor response(s) for the SpCell beam failure recovery using contention-free Random Access Preamble; <br><br> - *prach-ConfigurationIndex*: *prach-ConfigurationIndex* for the SpCell beam failure recovery; <br><br> - *ra-ssb-OccasionMaskIndex*: *ra-ssb-OccasionMaskIndex* for the SpCell beam failure recovery; <br><br> - *ra-OccasionList*: *ra-OccasionList* for the SpCell beam failure recovery. |
| The following UE variables are used for the beam failure detection procedure: <br><br> - BFI_COUNTER (per Serving Cell): counter for beam failure instance indication which is initially set to 0. |
| The MAC entity shall for each Serving Cell configured for beam failure detection: <br><br> 1> if beam failure instance indication has been received from lower layers: <br><br>     2> start or restart the *beamFailureDetectionTimer*; |

2> increment *BFI_COUNTER* by 1;

2> if *BFI_COUNTER* >= *beamFailureInstanceMaxCount*:

3> if the Serving Cell is SCell:

4> trigger a BFR for this Serving Cell;

3> else:

4> initiate a Random Access procedure on the SpCell.

1> if the *beamFailureDetectionTimer* expires; or

1> if *beamFailureDetectionTimer*, *beamFailureInstanceMaxCount*, or any of the reference signals used for beam failure detection is reconfigured by upper layers associated with this Serving Cell:

2> set *BFI_COUNTER* to 0.

1> if the Serving Cell is SpCell and the Random Access procedure initiated for SpCell beam failure recovery is successfully completed:

2> set *BFI_COUNTER* to 0;

2> stop the *beamFailureRecoveryTimer*, if configured;

2> consider the Beam Failure Recovery procedure successfully completed.

1> else if the Serving Cell is SCell, and a PDCCH addressed to C-RNTI indicating uplink grant for a new transmission is received for the HARQ process used for the transmission of the BFR MAC CE or Truncated BFR MAC CE which contains beam failure recovery information of this Serving Cell; or 1> if the SCell is deactivated:

2> set *BFI_COUNTER* to 0;

2> consider the Beam Failure Recovery procedure successfully completed and cancel all the triggered BFRs for this Serving Cell.

The MAC entity shall:

1> if the Beam Failure Recovery procedure determines that at least one BFR has been triggered and not cancelled:

2> if UL-SCH resources are available for a new transmission and if the UL-SCH resources can accommodate the BFR MAC CE plus its subheader as a result of LCP:

3> instruct the Multiplexing and Assembly procedure to generate the BFR MAC CE.

2> else if UL-SCH resources are available for a new transmission and if the UL-SCH resources can accommodate the Truncated BFR MAC CE plus its subheader as a result of LCP:

3> instruct the Multiplexing and Assembly procedure to generate the Truncated BFR MAC CE.

2> else:

3> trigger the SR for SCell beam failure recovery for each SCell for which BFR has been triggered and not cancelled.

All BFRs triggered prior to MAC PDU assembly for beam failure recovery for a SCell shall be cancelled when a MAC PDU is transmitted and this PDU includes a BFR MAC CE or Truncated BFR MAC CE which contains beam failure information of that SCell.

6.1.3.23 BFR MAC CEs

The MAC CEs for BFR consists of either:

- BFR MAC CE; or
- Truncated BFR MAC CE.

The BFR MAC CE and Truncated BFR MAC CE are identified by a MAC subheader with LCID/eLCID.

The BFR MAC CE and Truncated BFR MAC CE have a variable size. They includes a bitmap and in ascending order based on the *ServCellIndex*, beam failure recovery information i.e. octets containing candidate beam availability indication (AC) for SCells indicated in the bitmap. For BFR MAC CE, a single octet bitmap (e.g., as shown in FIG.2(a)) is used when the highest *ServCellIndex* of this MAC entity's SCell for which beam failure is detected is less than 8, otherwise four octets (e.g., as shown in FIG.2(b)) are used. A MAC PDU shall contain at most one BFR MAC CE.

For Truncated BFR MAC CE, a single octet bitmap (e.g., as shown in FIG.2(a)) is used for the following cases, otherwise four octets (e.g., as shown in FIG.2(b)) are used:

- the highest *ServCellIndex* of this MAC entity's SCell for which beam failure is detected is less than 8; or

- beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:

- SP: This field indicates beam failure detection for the SpCell of this MAC entity. The SP field is set to 1 to indicate that beam failure is detected for SpCell only when BFR MAC CE or Truncated BFR MAC CE is to be included into a MAC PDU as part of Random Access Procedure (as specified in 5.1.3a and 5.1.4), otherwise, it is set to 0.

- $C_i$ (BFR MAC CE): This field indicates beam failure detection and the presence of an octet containing the AC field for the SCell with *ServCellIndex* i as specified in TS 38.331 [5]. The $C_i$ field set to 1 indicates that beam failure is detected and the octet containing the AC field is present for the SCell with *ServCellIndex* i. The $C_i$ field set to 0 indicates that the beam failure is not detected and octet containing the AC field is not present for the SCell with *ServCellIndex* i. The octets containing the AC field are present in ascending order based on the *ServCellIndex*;

- $C_i$ (Truncated BFR MAC CE): This field indicates beam failure detection for the SCell with *ServCellIndex* i as specified in TS 38.331 [5]. The $C_i$ field set to 1 indicates that beam failure is detected and the octet containing the AC field for the SCell with *ServCellIndex* i may be present. The $C_i$ field set to 0 indicates that the beam failure is not detected and the octet containing the AC field is not present for the SCell with *ServCellIndex* i. The octets containing the AC field, if present, are included in ascending order based on the *ServCellIndex*. The number of octets containing the AC field included is maximised, while not exceeding the available grant size;

NOTE: The number of the octets containing the AC field in the Truncated BFR MAC CE can be zero.

- AC: This field indicates the presence of the Candidate RS ID field in this octet. If at least one of the SSBs with SS-RSRP above *rsrp-ThresholdBFR* amongst the SSBs in *candidateBeamRSSCellList* or the CSI-RSs with CSI-RSRP above *rsrp-ThresholdBFR* amongst the CSI-RSs in *candidateBeamRSSCellList* is available, the AC field is set to 1; otherwise, it is set to 0. If the AC field set to 1, the Candidate RS ID field is present. If the AC field set to 0, R bits are present instead;

- Candidate RS ID: This field is set to the index of an SSB with SS-RSRP above *rsrp-ThresholdBFR* amongst the SSBs in *candidateBeamRSSCellList* or to the index of a CSI-RS with CSI-RSRP above *rsrp-ThresholdBFR* amongst the CSI-RSs in *candidateBeamRSSCellList*. The length of this field is 6 bits.

- R: Reserved bit, set to 0.

4.2.1    UE states and state transitions including inter RAT

A UE is either in RRC_CONNECTED state or in RRC_INACTIVE state when an RRC connection has been established. If this is not the case, i.e. no RRC connection is established, the UE is in RRC_IDLE state.

*BeamFailureRecoveryConfig*

The IE *BeamFailureRecoveryConfig* is used to configure the UE with RACH resources and candidate beams for beam failure recovery in case of beam failure detection. One implementation of *BeamFailureRecoveryConfig* information element may be referred from one or more of the following points shown in the Table 7.1.

Table 7.1: *BeamFailureRecoveryConfig* information element

```
-- ASN1START

-- TAG-BEAMFAILURERECOVERYCONFIG-START

BeamFailureRecoveryConfig ::=        SEQUENCE { rootSequenceIndex-BFR            INTEGER (0..137)
OPTIONAL, -- Need M rach-ConfigBFR                   RACH-ConfigGeneric
OPTIONAL, -- Need M rsrp-ThresholdSSB                RSRP-Range
OPTIONAL, -- Need M candidateBeamRSList              SEQUENCE (SIZE(1..maxNrofCandidateBeams)) OF
PRACH-ResourceDedicatedBFR    OPTIONAL, -- Need M ssb-perRACH-Occasion             ENUMERATED {oneEighth, oneFourth, oneHalf, one, two,
```

```
                                        four, eight, sixteen}
OPTIONAL, -- Need M ra-ssb-OccasionMaskIndex        INTEGER (0..15)
OPTIONAL, -- Need M recoverySearchSpaceId           SearchSpaceId
OPTIONAL, -- Need R ra-Prioritization               RA-Prioritization
OPTIONAL, -- Need R beamFailureRecoveryTimer        ENUMERATED {ms10, ms20, ms40, ms60, ms80, ms100,
ms150, ms200}           OPTIONAL, -- Need M

...,

[[ msg1-SubcarrierSpacing          SubcarrierSpacing
OPTIONAL   -- Need M

]],

[[ ra-PrioritizationTwoStep-r16    RA-Prioritization
OPTIONAL, -- Need R candidateBeamRSListExt-r16      SEQUENCE (SIZE(0..maxNrofCandidateBeamsExt-r16))
OF PRACH-ResourceDedicatedBFR OPTIONAL -- Need

]]
}

PRACH-ResourceDedicatedBFR ::=      CHOICE { ssb                             BFR-SSB-Resource, csi-RS                          BFR-CSIRS-Resource
}

BFR-SSB-Resource ::=                SEQUENCE { ssb                             SSB-Index, ra-PreambleIndex                INTEGER (0..63),

...
}

BFR-CSIRS-Resource ::=              SEQUENCE {
```

```
        csi-RS                          NZP-CSI-RS-ResourceId, ra-OccasionList                     SEQUENCE (SIZE(1..maxRA-OccasionsPerCSIRS)) OF
INTEGER (0..maxRA-Occasions-1)          OPTIONAL,    -- Need R ra-PreambleIndex                    INTEGER (0..63)
OPTIONAL,    -- Need R

...

}

-- TAG-BEAMFAILURERECOVERYCONFIG-STOP

-- ASN1STOP
```

| 1> *BeamFailureRecoveryConfig* field descriptions |
|---|
| *beamFailureRecoveryTimer* <br> Timer for beam failure recovery timer. Upon expiration of the timer the UE does not use CFRA for BFR. Value in ms. Value *ms10* corresponds to 10 ms, value *ms20* corresponds to 20 ms, and so on. |
| *candidateBeamRSList, candidateBeamRSListExt-r16* <br> A list of reference signals (CSI-RS and/or SSB) identifying the candidate beams for recovery and the associated RA parameters. The network configures these reference signals to be within the linked DL BWP (i.e., within the DL BWP with the same *bwp-Id*) of the UL BWP in which the *BeamFailureRecoveryConfig* is provided. |
| *msg1-SubcarrierSpacing* <br> Subcarrier spacing for contention free beam failure recovery. Only the values 15 kHz or 30 kHz (FR1), and 60 kHz or 120 kHz (FR2) are applicable. See TS 38.211 [16] |
| *rsrp-ThresholdSSB* <br> L1-RSRP threshold used for determining whether a candidate beam may be used by the UE to attempt contention free random access to recover from beam failure (see TS 38.213 [13]). |
| *ra-prioritization* <br> Parameters which apply for prioritized random access procedure for BFR (see TS 38.321 [3]). |
| *ra-PrioritizationTwoStep* <br> Parameters which apply for prioritized 2-step random access procedure for BFR (see TS 38.321 [3]). |
| *ra-ssb-OccasionMaskIndex* <br> Explicitly signalled PRACH Mask Index for RA Resource selection in TS 38.321 [3]. The mask is valid for all SSB resources. |
| *rach-ConfigBFR* <br> Configuration of contention free random access occasions for BFR. |
| *recoverySearchSpaceId* <br> Search space to use for BFR RAR. The network configures this search space to be within the linked DL BWP (i.e., within the DL BWP with the same *bwp-Id*) of the UL BWP in which the *BeamFailureRecoveryConfig* is provided. The CORESET associated with the recovery search space cannot be associated with another search space. Network always configures the UE with a value for this field when contention free random access resources for BFR are configured. |
| *rootSequenceIndex-BFR* <br> PRACH root sequence index (see TS 38.211 [16]) for beam failure recovery. |
| *ssb-perRACH-Occasion* <br> Number of SSBs per RACH occasion for CF-BFR, see TS 38.213 [13]. |

| 2> BFR-CSIRS-Resource field descriptions |
|---|
| *csi-RS* <br> The ID of a *NZP-CSI-RS-Resource* configured in the *CSI-MeasConfig* of this serving cell. This reference signal determines a candidate beam for beam failure recovery (BFR). |
| *ra-OccasionList* <br> RA occasions that the UE shall use when performing BFR upon selecting the candidate beam identified by this CSI-RS. The network ensures that the RA occasion indexes provided herein are also configured by *prach-ConfigurationIndex* and *msg1-FDM*. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. <br> If the field is absent the UE uses the RA occasion associated with the SSB that is QCLed with this CSI-RS. |
| *ra-PreambleIndex* <br> The RA preamble index to use in the RA occasions associated with this CSI-RS. If the field is absent, the UE uses the preamble index associated with the SSB that is QCLed with this CSI-RS. |

| 3> BFR-SSB-Resource field descriptions |
|---|
| *ra-PreambleIndex* <br> The preamble index that the UE shall use when performing BFR upon selecting the candidate beams identified by this SSB. |
| *ssb* <br> The ID of an SSB transmitted by this serving cell. It determines a candidate beam for beam failure recovery (BFR). |

– *BeamFailureRecoverySCellConfig*

The IE *BeamFailureRecoverySCellConfig* is used to configure the UE with candidate beams for beam failure recovery in case of beam failure detection in SCell. One implementation of *BeamFailureRecoverySCellConfig* information element may be referred from one or more points shown in the Table 7.2.

Table 7.2: *BeamFailureRecoverySCellConfig* information element

```
-- ASN1START

-- TAG-BEAMFAILURERECOVERYSCELLCONFIG-START

BeamFailureRecoverySCellConfig-r16 ::= SEQUENCE {
    rsrp-ThresholdBFR-r16             RSRP-Range
OPTIONAL, -- Need M candidateBeamRSSCellList-r16      SEQUENCE (SIZE(1..maxNrofCandidateBeams-r16))
OF CandidateBeamRS-r16    OPTIONAL, -- Need M

...
}

CandidateBeamRS-r16 ::=           SEQUENCE {
```

```
        candidateBeamConfig-r16            CHOICE { ssb-r16                        SSB-Index, csi-RS-r16                     NZP-CSI-RS-ResourceId

}, servingCellId                      ServCellIndex
OPTIONAL   -- Need R

}

-- TAG-BEAMFAILURERECOVERYSCELLCONFIG-STOP

-- ASN1STOP
```

| 4> *BeamFailureRecoverySCellConfig* field descriptions |
|---|
| *candidateBeamConfig* <br> Indicates the resource (i.e. SSB or CSI-RS) defining this beam resource. |
| *candidateBeamRSSCellList* <br> A list of reference signals (CSI-RS and/or SSB) identifying the candidate beams for recovery. The network always configures this parameter in every instance of this IE. |
| *rsrp-ThresholdBFR* <br> L1-RSRP threshold used for determining whether a candidate beam may be included by the UE be in BFR MAC CE (see TS 38.213 [13]). The network always configures this parameter in every instance of this IE. |
| *servingCellId* <br> If the field is absent, the RS belongs to the serving cell in which this *BeamFailureSCellRecoveryConfig* is configured |

*RadioLinkMonitoringConfig*

The IE *RadioLinkMonitoringConfig* is used to configure radio link monitoring for detection of beam- and/or cell radio link failure. One implementation of *RadioLinkMonitoringConfig* information element may be referred from one or more possible points shown in the Table 7.3.

Table 7.3: ***RadioLinkMonitoringConfig* information element**

```
-- ASN1START

-- TAG-RADIOLINKMONITORINGCONFIG-START

RadioLinkMonitoringConfig ::=     SEQUENCE { failureDetectionResourcesToAddModList    SEQUENCE
(SIZE(1..maxNrofFailureDetectionResources)) OF RadioLinkMonitoringRS OPTIONAL, -- Need N
```

```
        failureDetectionResourcesToReleaseList   SEQUENCE
(SIZE(1..maxNrofFailureDetectionResources)) OF RadioLinkMonitoringRS-Id OPTIONAL, -- Need N beamFailureInstanceMaxCount          ENUMERATED {n1, n2, n3, n4, n5, n6, n8, n10}
OPTIONAL, -- Need R beamFailureDetectionTimer            ENUMERATED {pbfd1, pbfd2, pbfd3, pbfd4, pbfd5,
pbfd6, pbfd8, pbfd10}   OPTIONAL, -- Need R

...
}

RadioLinkMonitoringRS ::=        SEQUENCE { radioLinkMonitoringRS-Id         RadioLinkMonitoringRS-Id, purpose                          ENUMERATED {beamFailure, rlf, both}, detectionResource                CHOICE { ssb-Index                        SSB-Index, csi-RS-Index                     NZP-CSI-RS-ResourceId

},

...

}

-- TAG-RADIOLINKMONITORINGCONFIG-STOP

-- ASN1STOP
```

| 5> *RadioLinkMonitoringConfig* field descriptions |
|---|
| *beamFailureDetectionTimer* <br> Timer for beam failure detection (see TS 38.321 [3]). See also the *BeamFailureRecoveryConfig* IE. Value in number of "$Q_{out,LR}$ reporting periods of Beam Failure Detection" Reference Signal (see TS 38.213 [13]). Value *pbfd1* corresponds to 1 $Q_{out,LR}$ reporting period of Beam Failure Detection Reference Signal, value *pbfd2* corresponds to 2 $Q_{out,LR}$ reporting periods of Beam Failure Detection Reference Signal and so on. |
| *beamFailureInstanceMaxCount* <br> This field determines after how many beam failure events the UE triggers beam failure recovery (see TS 38.321 [3]). Value n1 corresponds to 1 beam failure instance, value n2 corresponds to 2 beam failure instances and so on. |

| |
|---|
| *failureDetectionResourcesToAddModList*<br>A list of reference signals for detecting beam failure and/or cell level radio link failure (RLF). The limits of the reference signals that the network can configure are specified in TS 38.213 [13]. The network configures at most two detectionResources per BWP for the purpose *beamFailure* or *both*. If no RSs are provided for the purpose of beam failure detection, the UE performs beam monitoring based on the activated *TCI-State* for PDCCH as described in TS 38.213 [13]. If no RSs are provided in this list for the purpose of RLF detection, the UE performs Cell-RLM based on the activated *TCI-State* of PDCCH as described in TS 38.213 [13]. The network ensures that the UE has a suitable set of reference signals for performing cell-RLM. |

| 6> *RadioLinkMonitoringRS* field descriptions |
|---|
| *detectionResource*<br>A reference signal that the UE shall use for radio link monitoring or beam failure detection (depending on the indicated *purpose*). Only periodic 1-port CSI-RS for BM can be configured on SCell for beam failure detection purpose. |
| *purpose*<br>Determines whether the UE shall monitor the associated reference signal for the purpose of cell- and/or beam failure detection. For SCell beam failure detection, network only configures the value to beamFailure. |

A UE may perform Link recovery procedures via one or more of the following points shown in Table 8.

TABLE 8

Link recovery procedures

A UE can be provided, for each BWP of a serving cell, a set $\bar{q}_0$ of periodic CSI-RS resource configuration indexes by failureDetectionResources or beamFailureDetectionResourceList and a set $\bar{q}_1$ of periodic CSI-RS resource configuration indexes and/or SS/PBCH block indexes by candidateBeamRSList or candidateBeamResourceList for radio link quality measurements on the BWP of the serving cell. If the UE is not provided $\bar{q}_0$ by failureDetectionResources or beamFailureDetectionResourceList for a BWP of the serving cell, the UE determines the set $\bar{q}_0$ to include periodic CSI-RS resource configuration indexes with same values as the RS indexes in the RS sets indicated by TCI-State for respective CORESETs that the UE uses for monitoring PDCCH and, if there are two RS indexes in a TCI state, the set To includes RS indexes with QCL-TypeD configuration for the corresponding TCI states. The UE expects the set $\bar{q}_0$ to include up to two RS indexes. The UE expects single port RS in the set $\bar{q}_0$.
The thresholds $Q_{out,LR}$ and $Q_{in,LR}$ correspond to the default value of rlmInSyncOutOfSyncThreshold, as described in [10, TS 38.133] for $Q_{out}$, and to the value provided by rsrp-ThresholdSSB or rsrp-ThresholdSSBBFR, respectively.
The physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations, or SS/PBCH blocks on the PCell or the PSCell, that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by powerControlOffsetSS.
In non-DRX mode operation, the physical layer in the UE provides an indication to higher layers when the radio link quality for all corresponding resource configurations in the set $\bar{q}_0$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations, and/or SS/PBCH blocks on the PCell or the PSCell, in the set $\bar{q}_0$ that the UE uses to assess the radio link quality and 2 msec. In DRX mode operation, the physical layer provides an indication to higher layers when the radio link quality is worse than the threshold $Q_{out,LR}$ with a periodicity determined as described in [10, TS 38.133].
Upon request from higher layers, the UE provides to higher layers the periodic CSI-RS configuration indexes and/or SS/PBCH block indexes from the set $\bar{q}_1$ and the corresponding L1-RSRP measurements that are larger than or equal to the $Q_{in,LR}$ threshold.
For the PCell or the PSCell, a UE can be provided a CORESET through a link to a search space set provided by recoverySearchSpaceId, for monitoring PDCCH in the CORESET. If the UE is provided recoverySearchSpaceId, the UE does not expect to be provided another search space set for monitoring PDCCH in the CORESET associated with the search space set provided by recoverySearchSpaceId.
For the PCell or the PSCell, the UE can be provided, by PRACH-ResourceDedicatedBFR, a configuration for PRACH transmission. For PRACH transmission in slot n and according to antenna port quasi co-location parameters associated with periodic CSI-RS resource configuration or with SS/PBCH block associated with index $q_{new}$ provided by higher layers [11, TS 38.321], the UE monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE assumes the same antenna port quasi-collocation parameters as the ones associated with index $q_{new}$ until the UE arrives by higher layers an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.
For the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo [11, TS 38.321] or is provided PUCCH-SpatialRelationInfo for PUCCH resource(s), the UE transmits a PUCCH on a same cell as the PRACH transmission using
  - a same spatial filter as for the last PRACH transmission
  - a power determined with $q_u = 0$, $q_d = q_{new}$, and $l = 0$
For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index qnew for PDCCH monitoring in a CORESET with index 0.
A UE can be provided, by schedulingRequestIDForBFR, a configuration for PUCCH transmission with a link recovery request (LRR). The UE can transmit in a first PUSCH at least one MAC CE providing one index for at least one corresponding SCell with radio link quality worse than $Q_{out,LR}$, an index $q_{new}$ for a periodic CSI-RS configuration or for a SS/PBCH block provided by higher layers, as described in [11, TS 38.321], if any, for a corresponding SCell. After 28 symbols from a last symbol of a PDCCH reception with a DCI format scheduling a PUSCH transmission with a same HARQ process number as for the transmission of the first PUSCH and having a toggled NDI field value, the UE
  - monitors PDCCH in all CORESETs on the SCell(s) indicated by the MAC CE using the same antenna port quasi co-location parameters as the ones associated with the corresponding index(es) $q_{new}$, if any
  - transmits PUCCH on a PUCCH-SCell using a same spatial domain filter as the one corresponding to $q_{new}$ for periodic CSI-RS or SS/PBCH block reception, and using a power determined with $q_u = 0$, $q_d = q_{new}$, and $l = 0$, if TABLE 8-continued Link recovery procedures

- the UE is provided PUCCH-SpatialRelationInfo for the PUCCH,
- a PUCCH with the LRR was either not transmitted or was transmitted on the PCell or the PSCell, and
- the PUCCH-SCell is included in the SCell(s) indicated by the MAC-CE where the SCS configuration for the 28 symbols is the smallest of the SCS configurations of the active DL BWP for the PDCCH reception and of the active DLBWP(s) of the at least one SCell.

Figure 8:
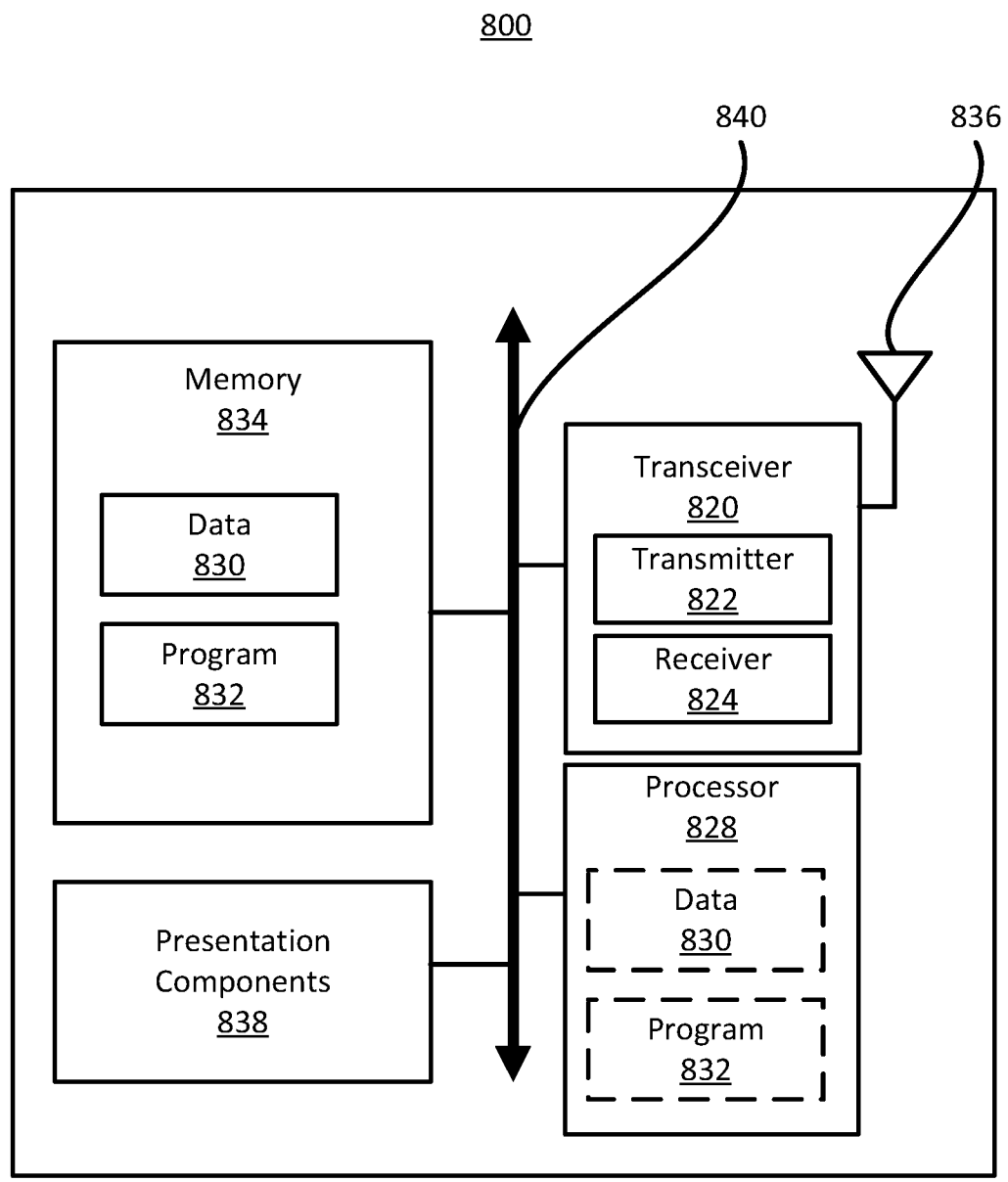
FIG. 8 is a block diagram illustrating a node for wireless communication in accordance with various aspects of the present disclosure.

FIG. 8 is a block diagram illustrating a node 800 for wireless communication in accordance with various aspects of the present disclosure. As illustrated in FIG. 8, a node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIG. 4.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable and flexibly usable subframes and slot formats. The transceiver 820 may be configured to receive data and control channels.

The node 800 may include a variety of computer-readable media. Computer-readable media may be any available media that may be accessed by the node 800 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 834 may include computer-storage media in the form of volatile and/or non-volatile memory. The memory 834 may be removable, non-removable, or a combination thereof. Example memory may include solid-state memory, hard drives, optical-disc drives, etc. As illustrated in FIG. 8, the memory 834 may store a computer-readable and/or computer-executable program 832 (e.g., software codes) that are configured to, when executed, cause the processor 828 to perform various functions disclosed herein, for example, with reference to FIG. 4. Alternatively, the program 832 may not be directly executable by the processor 828 but may be configured to cause the node 800 (e.g., when compiled and executed) to perform various functions disclosed herein.

The processor 828 (e.g., having processing circuitry) may include an intelligent hardware device, e.g., a Central Processing Unit (CPU), a microcontroller, an ASIC, etc. The processor 828 may include memory. The processor 828 may process the data 830 and the program 832 received from the memory 834, and information transmitted and received via the transceiver 820, the base band communications module, and/or the network communications module. The processor 828 may also process information to send to the transceiver 820 for transmission via the antenna 836 to the network communications module for transmission to a CN.

One or more presentation components 838 may present data indications to a person or another device. Examples of presentation components 838 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a user equipment (UE) for wireless communication in a wireless communication system, the method comprising:
receiving a Beam Failure Recovery (BFR) configuration including a configuration list that includes a plurality of configurations, the BFR configuration being used for a serving cell, each of the plurality of configurations indicating a Downlink (DL) Reference Signal (RS);
selecting, for the serving cell, a configuration from the plurality of configurations included in the configuration list, wherein a measurement metric of the DL RS indicated by the selected configuration is greater than a threshold; and transmitting a Medium Access Control (MAC) Control Element (CE) including at least one bitmap, the at least one bitmap indicating the DL RS indicated by the selected configuration, wherein a value indicated by the at least one bitmap corresponds to a configuring order of the selected configuration.

2. The method according to claim 1, wherein the serving cell comprises a secondary serving cell.

3. The method according to claim 1, wherein the value indicated by the at least one bitmap does not refer to an identifier value of the DL RS indicated by the selected configuration.

4. The method according to claim 1, wherein the DL RS indicated by the selected configuration comprises a Channel State Information (CSI)-Reference Signal (RS) or a Synchronization Signal Block (SSB).

5. The method according to claim 1, wherein the at least one bitmap comprises 6 bits.

6. The method according to claim 1, wherein the value indicated by the at least one bitmap corresponds to the configuring order of the selected configuration in the configuration list that is ordered ascendingly.

7. A user equipment (UE) for wireless communication in a wireless communication system, the UE comprising:
one or more non-transitory computer-readable media storing computer-executable instructions; and
at least one processor coupled to the one or more non-transitory computer-readable media, the at least one processor configured to execute the computer-executable instructions to cause the UE to perform operations comprising:

receiving a Beam Failure Recovery (BFR) configuration including a configuration list that includes a plurality of configurations, the BFR configuration being used for the first serving cell, each of the plurality of configurations indicating a Downlink (DL) Reference Signal (RS);

selecting, for the serving cell, a configuration from the plurality of configurations included in the configuration list, wherein a measurement metric of the DL RS indicated by the selected configuration is greater than a threshold; and transmitting a Medium Access Control (MAC)-Control Element (CE) including at least one bitmap, the at least one bitmap indicating the DL RS indicated by the selected configuration, wherein a value indicated by the at least one bitmap corresponds to a configuring order of the selected configuration.

8. The UE according to claim 7, wherein the serving cell comprises a secondary serving cell.

9. The UE according to claim 7, wherein the value indicated by the at least one bitmap does not refer to an identifier value of the DL RS indicated by the selected configuration.

10. The UE according to claim 7, wherein the DL RS indicated by the selected configuration comprises a Channel State Information (CSI)-Reference Signal (RS) or a Synchronization Signal Block (SSB).

11. The UE according to claim 7, wherein the at least one bitmap comprises 6 bits.

12. The UE according to claim 7, wherein the value indicated by the at least one bitmap corresponds to the configuring order of the selected configuration in the configuration list that is ordered ascendingly.

* * * * *